United States Patent
Nakamura et al.

(10) Patent No.: US 7,428,010 B2
(45) Date of Patent: Sep. 23, 2008

(54) PHOTOSENSOR SYSTEM AND DRIVE CONTROL METHOD FOR OPTIMAL SENSITIVITY

(75) Inventors: Yoshiaki Nakamura, Ome (JP); Yasushi Mizutani, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/742,462

(22) Filed: Apr. 30, 2007

(65) Prior Publication Data

US 2007/0206113 A1    Sep. 6, 2007

Related U.S. Application Data

(63) Continuation of application No. 10/171,972, filed on Jun. 14, 2002, now Pat. No. 7,268,807.

(30) Foreign Application Priority Data

| Jun. 18, 2001 | (JP) | ............................. 2001-183623 |
| Feb. 20, 2002 | (JP) | ............................. 2002-042747 |

(51) Int. Cl.
  *H04N 5/235* (2006.01)
(52) U.S. Cl. .................... 348/229.1; 348/297; 348/246; 348/362
(58) Field of Classification Search ............. 348/229.1, 348/246, 362, 297
See application file for complete search history.

(56) References Cited

U.S. PATENT DOCUMENTS

| 5,461,419 | A |  | 10/1995 | Yamada |
| 5,583,570 | A |  | 12/1996 | Yamada |
| 6,298,144 | B1 |  | 10/2001 | Pucker, II et al. |
| 6,831,696 | B1 | * | 12/2004 | Saeki ............................ 348/362 |
| 6,879,344 | B1 | * | 4/2005 | Nakamura et al. ........... 348/362 |
| 6,906,745 | B1 |  | 6/2005 | Fossum et al. |
| 6,979,834 | B2 | * | 12/2005 | Ochiai et al. ............ 250/559.42 |
| 2001/0013903 | A1 | * | 8/2001 | Suzuki et al. ................ 348/362 |
| 2001/0030708 | A1 | * | 10/2001 | Ide et al. ...................... 348/362 |

FOREIGN PATENT DOCUMENTS

| EP | 0 509 822 A2 | 10/1992 |
| JP | 11-187199 A | 7/1999 |
| JP | 2001-136340 A | 5/2001 |
| JP | 2001-292377 A | 10/2001 |
| JP | 2002-027251 A | 1/2002 |
| WO | WO 01/24512 A1 | 4/2001 |
| WO | WO 01/35637 A1 | 5/2001 |
| WO | WO 01/35638 A1 | 5/2001 |

* cited by examiner

*Primary Examiner*—Tuan Ho
*Assistant Examiner*—Anthony J Daniels
(74) *Attorney, Agent, or Firm*—Frishauf, Holtz, Goodman & Chick, P.C.

(57) ABSTRACT

A photosensor system includes a photosensor array constituted by two dimensionally arraying a plurality of photosensors, an image reading section which reads a subject image at a predetermined image reading sensitivity by using the photosensor array, a sensitivity adjustment image reading section which reads a sensitivity adjustment subject image while the image reading sensitivity in the photosensor array is changed to a plurality of stages, an optimal image reading sensitivity deriving section which derives an image reading sensitivity optimal for reading operation of the subject image, on the basis of a pixel data group relating to an image pattern of the subject image read by the sensitivity adjustment image reading section, and an image reading sensitivity setting section which sets the optimal image reading sensitivity as the image reading sensitivity in the image reading section.

39 Claims, 28 Drawing Sheets

| ROW NUMBER | 176TH ROW | 152ND ROW | 128TH ROW | 104TH ROW | 80TH ROW |
|---|---|---|---|---|---|
| MAXIMUM VALUE | 255 | 255 | 251 | 127 | 25 |
| MINIMUM VALUE | 249 | 153 | 27 | 0 | 0 |
| DYNAMIC RANGE | 6 | 102 | 224 | 127 | 25 |

| ROW NUMBER | 1ST ROW | ... | 128TH ROW | ... | 256TH ROW |
|---|---|---|---|---|---|
| CHARGE ACCUMULATING PERIOD | $T_1$ | ... | $T_{128}$ | ... | $T_{256}$ |

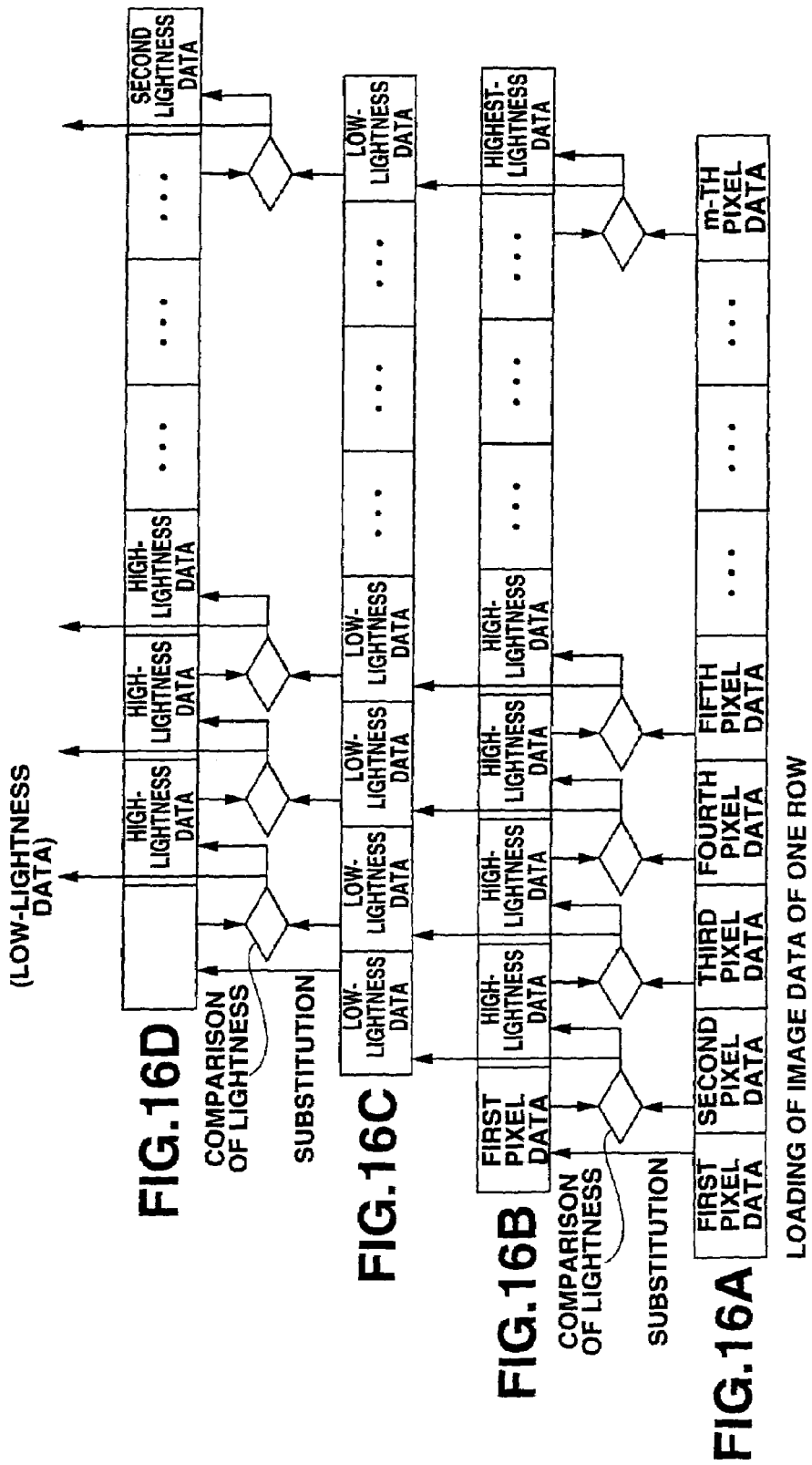

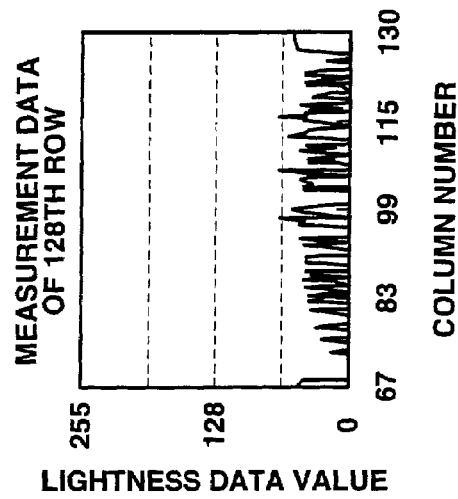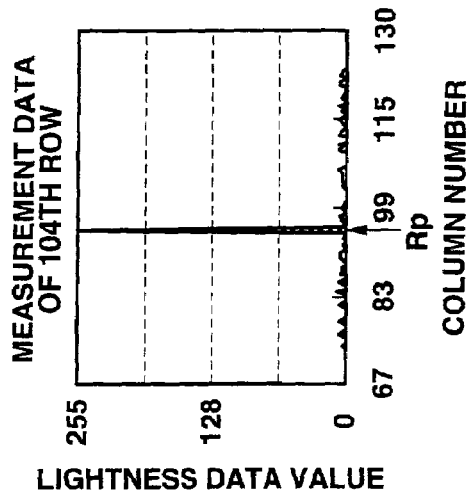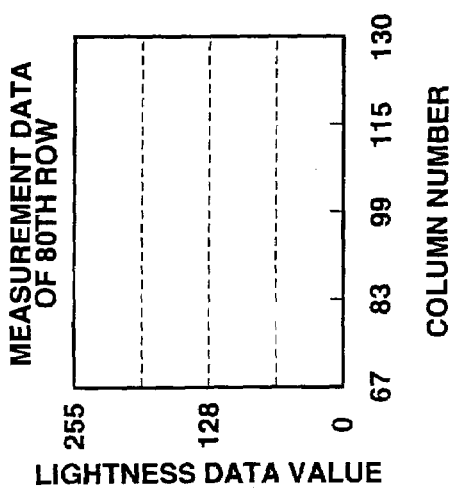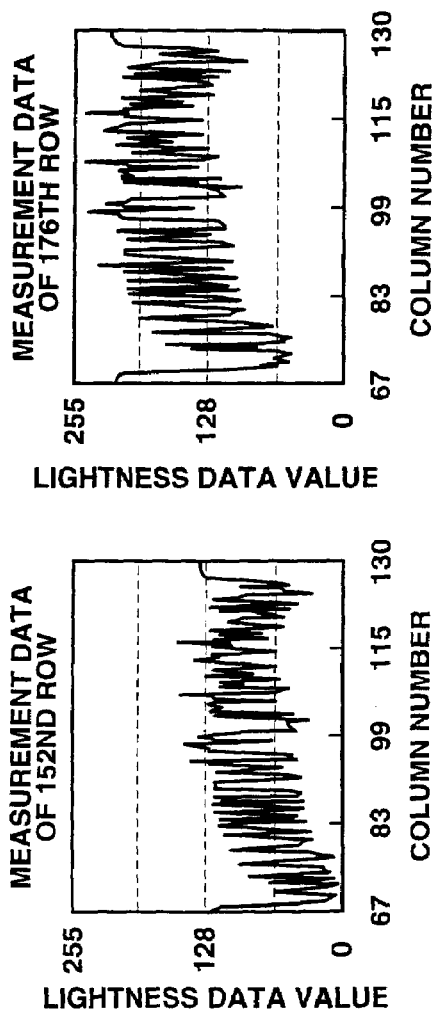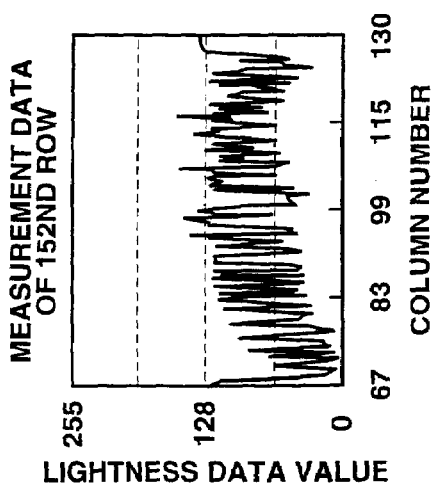

| ROW NUMBER | 80TH ROW | 104TH ROW | 128TH ROW | 152ND ROW | 176TH ROW |
|---|---|---|---|---|---|
| MAXIMUM VALUE | 0 | 255 | 65 | 140 | 251 |
| MINIMUM VALUE | 0 | 0 | 0 | 5 | 58 |
| DYNAMIC RANGE | 0 | 255 | 65 | 135 | 193 |

| ROW NUMBER | 104TH ROW | . . | 104TH ROW | . . . | 256TH ROW |
|---|---|---|---|---|---|
| CHARGE ACCUMULATING PERIOD | $T_1$ | . . | $T_{104}$ | . . . | $T_{256}$ |

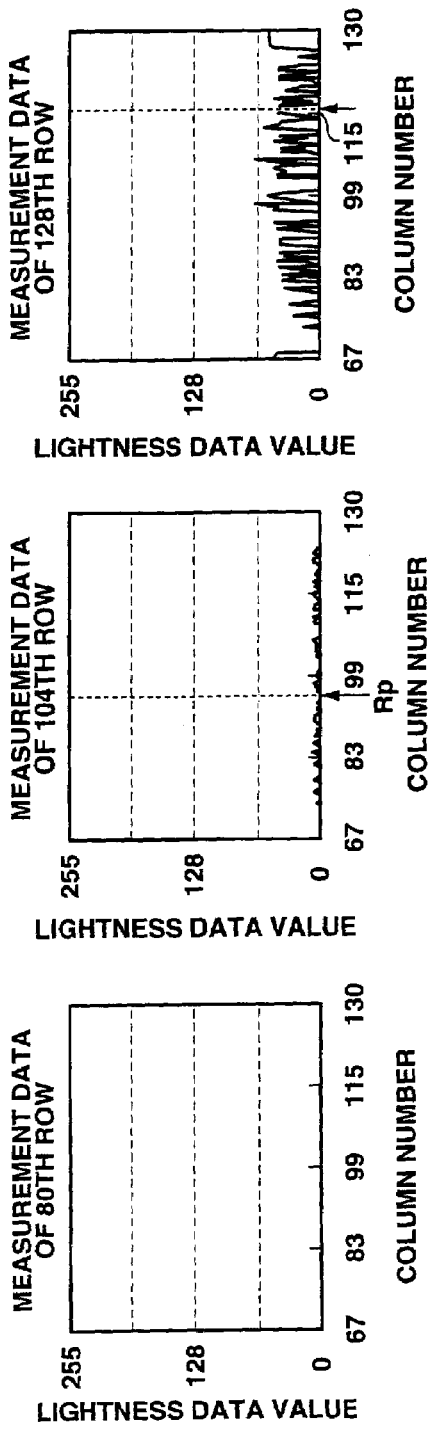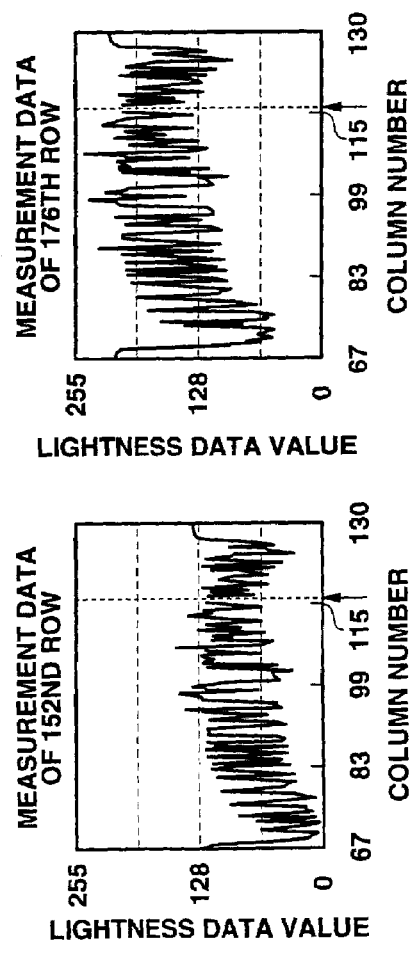

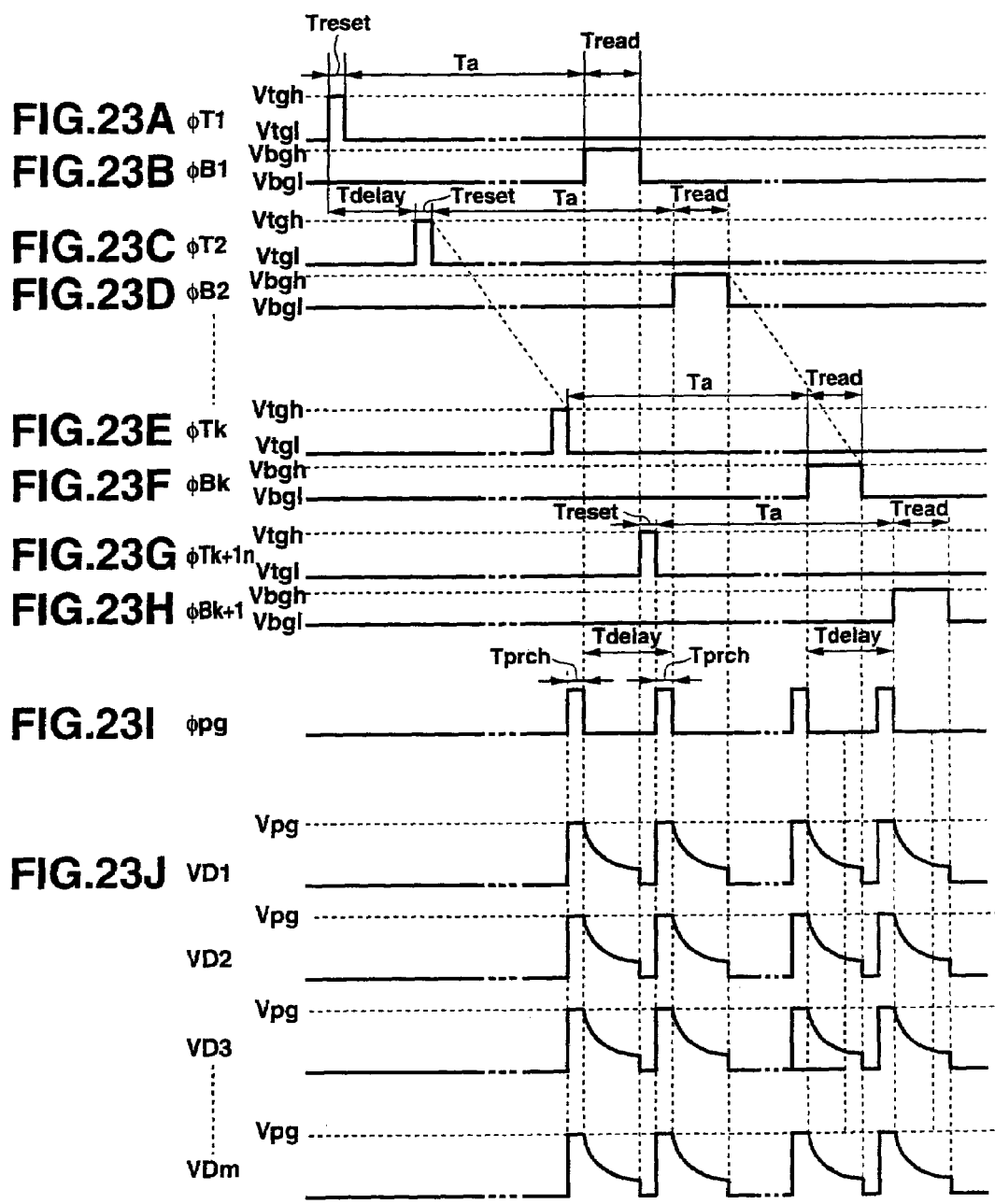

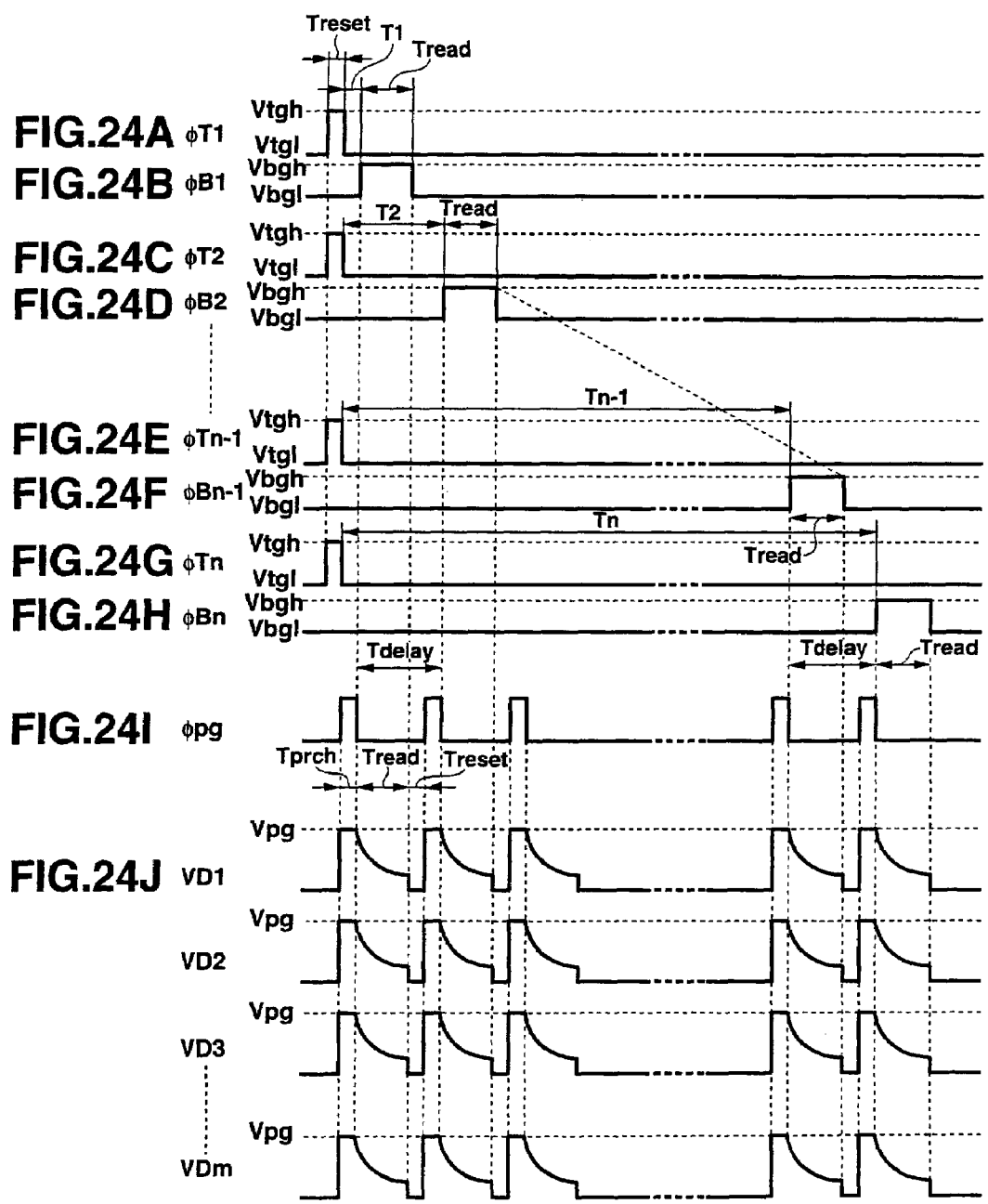

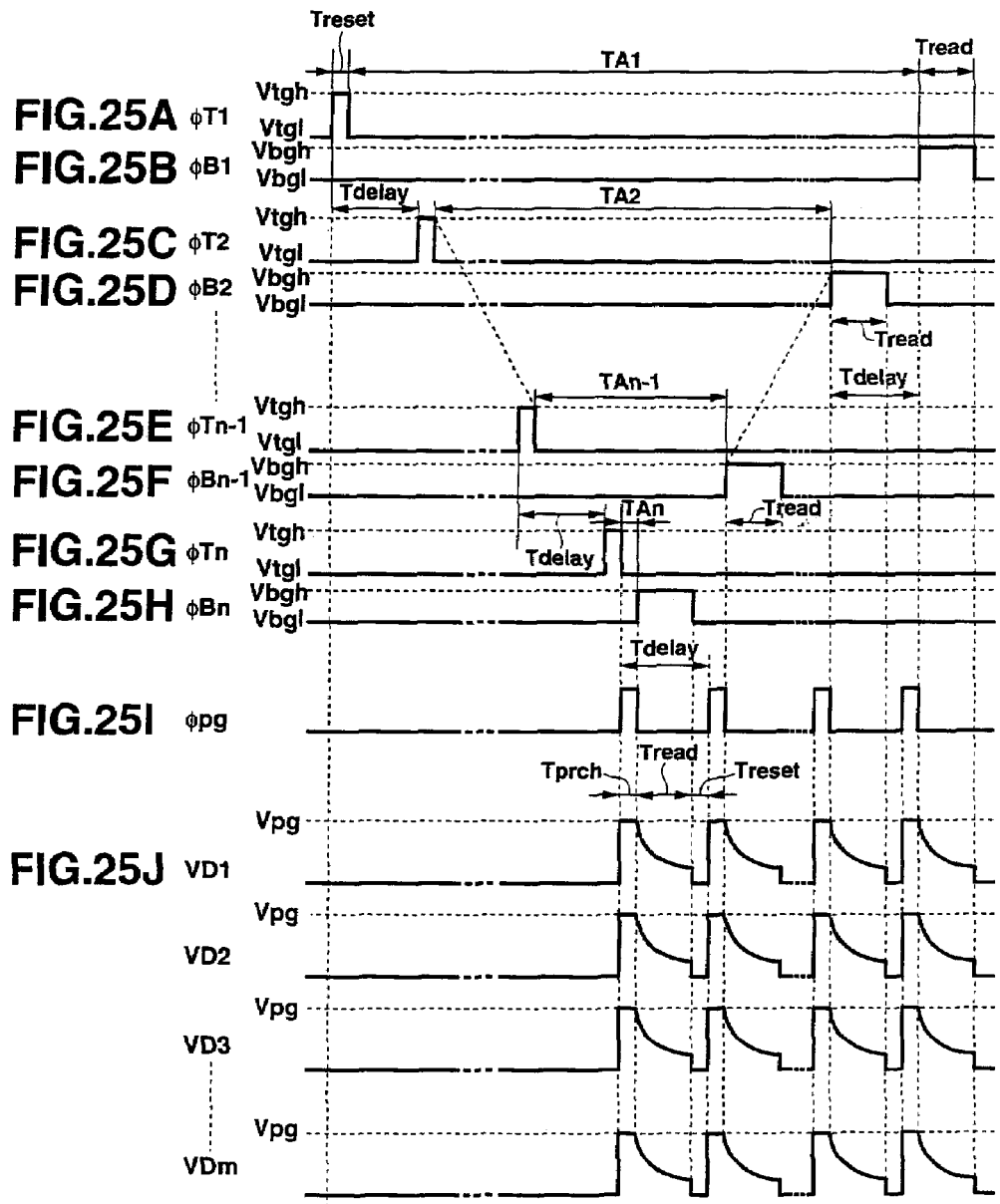

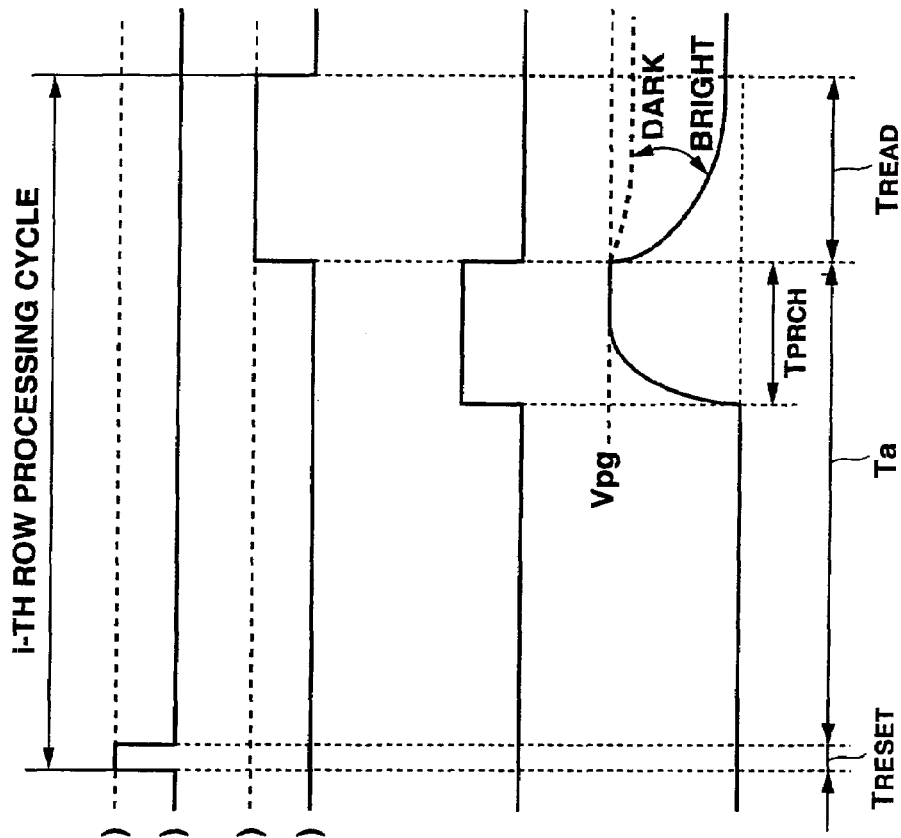

PHOTOSENSOR SYSTEM AND DRIVE CONTROL METHOD FOR OPTIMAL SENSITIVITY

CROSS-REFERENCE TO RELATED APPLICATIONS

The present application is a Continuation Application of U.S. application Ser. No. 10/171,972 filed Jun. 14, 2002 now U.S. Pat. No. 7,268,807, which is based upon and claims the benefit of priority from the prior Japanese Patent Applications No. 2001-183623, filed Jun. 18, 2001; and No. 2002-042747, filed Feb. 20, 2002, the entire contents of which are incorporated herein by reference.

BACKGROUND OF THE INVENTION

1. Field of the Invention

The present invention relates to a photosensor system having a photosensor array constituted by two-dimensionally arraying a plurality of photosensors, and a drive control method in the photosensor system.

2. Description of the Related Art

One of conventional two-dimensional image reading apparatuses for reading printed matter, a photograph, or a fine three-dimensional shape such as a fingerprint is a photosensor system having a photosensor array constituted by arraying photoelectric converting elements (photosensors) arranged in a matrix.

As well known, a CCD has a structure in which photosensors such as photodiodes or thin film transistors (TFT: Thin Film Transistor) are arranged in a matrix, and the amount of electron-hole pairs (the amount of charge) generated corresponding to the amount of light entering a light receiving section of each photosensor is detected by a horizontal scanning circuit and vertical scanning circuit to detect the luminance of radiation.

In a photosensor system using such a CCD, it is necessary to respectively provide selective transistors for causing the scanned photosensor to assume a selected state. This increases the system size as the number of pixels increases.

In place of the combination of the photosensor and the selective transistor, a photosensor (to be referred to as a double-gate photosensor hereinafter) is now being developed, which is formed of a thin film transistor having a so-called double-gate structure and has both a photosensing function and a selecting function.

FIG. 26A is a sectional view showing the structure of a double-gate photosensor 10. FIG. 26B is a circuit diagram showing the equivalent circuit of the double-gate photosensor 10.

The double-gate photosensor 10 comprises a semiconductor thin film 11 formed of amorphous silicon or the like, $n^+$-silicon layers 17 and 18 respectively formed at the two ends of the semiconductor thin film 11, source and drain electrodes 12 and 13 respectively formed on the $n^+$-silicon layers 17 and 18, a top gate electrode 21 formed above the semiconductor thin film 11 via a block insulating film 14 and upper gate insulating film 15, a protective insulating film 20 provided on the top gate electrode 21, and a bottom gate electrode 22 provided below the semiconductor thin film 11 via a lower gate insulating film 16. The double-gate photosensor 10 is provided on a transparent insulating substrate 19 formed of glass or the like.

In other words, the double-gate photosensor 10 includes an upper MOS transistor comprised of the semiconductor thin film 11, source electrode 12, drain electrode 13, and top gate electrode 21, and a lower MOS transistor comprised of the semiconductor thin film 11, source electrode 12, drain electrode 13, and bottom gate electrode 22. As is shown in the equivalent circuit of FIG. 26B, the double-gate photosensor 10 is considered to include two MOS transistors having a common channel region formed of the semiconductor thin film 11, TG (Top Gate terminal), BG (Bottom Gate terminal), S (Source terminal), and D (Drain terminal).

The protective insulating film 20, top gate electrode 21, upper gate insulating film 15, block insulating film 14, and lower gate insulating film 16 are all formed of a material having a high transmittance of visible light for activating the semiconductor layer 11. Light entering the sensor from the top gate electrode 21 side passes through the top gate electrode 21, upper gate insulating film 15, and block insulating film 14, and then enters the semiconductor thin film 11, thereby generating and accumulating charges (positive holes) in a channel region therein.

FIG. 27 is a schematic view showing a photosensor system constituted by two-dimensionally arraying double-gate photosensors 10. As shown in FIG. 27, the photosensor system comprises a sensor array 100 that is constituted of a large number of double-gate photosensors 10 arranged in an n×m matrix, top and bottom gate lines 101 and 102 that respectively connect the top gate terminals TG and bottom gate terminals BG of the double-gate photosensors 10 in a row direction, top and bottom gate drivers 110 and 120 respectively connected to the top and bottom gate lines 101 and 102, data lines 103 that respectively connect the drain terminals D of the double-gate photosensors 10 in a column direction, and an output circuit section 130 connected to the data lines 103.

In FIG. 27, φtg and φbg represent control signals for generating a reset pulse φTi and readout pulse φBi, respectively, which will be described later, and φpg represents a pre-charge pulse for controlling the timing at which a pre-charge voltage Vpg is applied.

In the above-described structure, as described later, the photosensing function is realized by applying a predetermined voltage from the top gate driver 110 to the top gate terminals TG, while the readout function is realized by applying a predetermined voltage from the bottom gate driver 120 to the bottom gate terminals BG, then sending the output voltage of the photosensors 10 to the output circuit section 130 via the data lines 103, and outputting serial data Vout.

FIGS. 28A to 28D are timing charts showing a drive control method of the photosensor system, and showing a detecting period (i-th row processing cycle) in the i-th row of the sensor array 100. First, a high-level pulse voltage (reset pulse; e.g., Vtgh=+15V) φTi shown in FIG. 28A is applied to the top gate line 101 of the i-th row, and during a reset period $T_{rest}$, reset operation for discharging the double-gate photosensors 10 of the i-th row is executed.

Subsequently, a bias voltage φTi of low level (e.g., Vtgl=−15V) is applied to the top gate line 101, thereby finishing the reset period $T_{rest}$ and starting a charge accumulating period Ta in which the channel region is charged. During the charge accumulating period Ta, charges (positive holes) corresponding to the amount of light entering each sensor from the top gate electrode side are accumulated in the channel region.

Then, a pre-charge pulse φpg shown in FIG. 28C with a pre-charge voltage Vpg is applied to the data lines 103 during the charge accumulating period Ta, and after a pre-charge period $T_{prch}$ for making the drain electrodes 13 keep a charge, a bias voltage (readout pulse φBi) of high level (e.g., Vbgh=+10V) shown in FIG. 28B is applied to the bottom gate line 102. At this time, the double-gate photosensors 10 are turned on to start a readout period $T_{read}$.

During the readout period $T_{read}$, the charges accumulated in the channel region serve to moderate a low-level voltage (e.g., Vtgl=−15V) which has an opposite polarity of charges accumulated in the channel region and is applied to each top gate terminal TG. Therefore, an n-type channel is formed by the voltage Vbgh at each bottom gate terminal BG, the voltage VD at the data lines 103 gradually reduces in accordance with the drain current with lapse of time after the pre-charge voltage Vpg is applied. More specifically, the tendency of change in the voltage VD at the data lines 103 depends upon the charges accumulating period Ta and the amount of received light. As shown in FIG. 28D, the voltage VD tends to gradually reduce when the incident light is dark, i.e., a small amount of light is received, and hence only small charges are accumulated, whereas the voltage VD tends to suddenly reduce when the incident light is bright, i.e., a large amount of light is received, and hence large charges are accumulated. From this, it is understood that the amount of radiation can be calculated by detecting the voltage VD at the data lines 103 a predetermined period after the start of the readout period $T_{read}$, or by detecting a period required until the voltage VD reaches a predetermined threshold voltage.

Image reading is performed by sequentially executing the above-described drive control for each row of the sensor array 100, or by executing the drive control for each row in a parallel manner at different timings at which the driving pulses do not overlap.

Although the photosensor system adopts the double-gate photosensor as a photosensor in the above description, even a photosensor system using a photodiode or phototransistor as a photosensor has operation steps: reset operation→charge accumulating operation→pre-charge operation→reading operation, and uses a similar drive sequence. The conventional photosensor system as above has the following problems.

In this photosensor system, such a photosensor array is formed on one surface of the transparent substrate such as a glass substrate, as described above, and a light source is provided on the back surface side of the transparent substrate. Light emitted by the light source irradiates a subject (finger or the like) placed above the photosensor array. The reflected light corresponding to the image pattern of a fingerprint or the like is received and detected as brightness information by each photosensor, reading the subject image. Image reading operation of the photosensor array detects brightness information on the basis of the amount of charges accumulated in each photosensor during a period corresponding to a set image reading sensitivity (charge accumulating period for the double-gate photosensor).

In the photosensor system using the above-described photosensor, factors including an environmental illuminance in a use place such as an indoor or outdoor place and the type of subject change depending on a use environment. To read a subject image in various use environments, the image reading sensitivity of the photosensor must be properly adjusted.

The proper image reading sensitivity of the photosensor changes depending on ambient conditions such as an environmental illuminance. In the prior art, therefore, a circuit for detecting the environmental illuminance must be additionally arranged. Alternatively, reading operation is done for a standard sample placed on the sensing surface before the start of normal image reading operation, while the reading sensitivity is changed to a plurality of values. An optimal image reading sensitivity corresponding to ambient conditions such as the environmental illuminance is obtained and set on the basis of detection result or reading result. However, the above-described prior art suffers the following problems.

(1) When the photosensor system is applied to a fingerprint reading apparatus or the like, the state of the skin surface layer of a finger (or human body) serving as a subject varies depending on the gender and age of the person, the individual difference such as the physical condition, or an external environment such as a temperature or humidity. This inhibits setting a proper image reading sensitivity when the image reading sensitivity is set based on reading operation before the start of normal image reading operation. For this reason, the apparatus malfunctions in fingerprint collation processing or the like.

More specifically, if the skin surface layer of the finger as a subject is keratinized, the brightness of the ridge pattern of the keratinized fingerprint is observed higher than that of a non-keratinized normal skin surface. The brightness difference detected by the photosensor becomes larger than an original value. If the image reading sensitivity is set based on this brightness information, the image reading sensitivity is set to a lower value than an originally appropriate value. As a result, a subject image such as a fingerprint cannot be accurately read, decreasing the collation precision of the fingerprint.

(2) If a foreign substance deposited on the sensing surface of the photosensor or a defect is generated in the photosensor element in reading operation before normal image reading operation, the direct use of a read result containing an abnormal value causes a failure in setting a proper image reading sensitivity. This inhibits accurate reading operation of a subject image. When this photosensor system is applied to a fingerprint reading apparatus, the apparatus may malfunction in fingerprint collation processing.

BRIEF SUMMARY OF THE INVENTION

The present invention provides an advantage to set a proper image reading sensitivity regardless of the individual difference of a subject or an environment in a photosensor system having a photosensor array constituted by two-dimensionally arraying a plurality of photosensors, and to set a proper image reading sensitivity and obtain a high-quality subject image by normal image reading operation even in the presence of abnormal pixel data caused by a pixel defect or foreign matter.

To achieve the above advantages, a photosensor system according to the present invention comprises a photosensor array constituted by two-dimensionally arraying a plurality of photosensors, an image reading section which reads a subject image at a predetermined image reading sensitivity by using the photosensor array, a sensitivity adjustment image reading section which reads a sensitivity adjustment subject image while the image reading sensitivity in the photosensor array is changed to a plurality of stages, an optimal image reading sensitivity deriving section which derives an image reading sensitivity optimal for reading operation of the subject image on the basis of a pixel data group relating to an image pattern of the subject image read by the sensitivity adjustment image reading section, and an image reading sensitivity setting section which sets the optimal image reading sensitivity as the image reading sensitivity in the image reading section.

To achieve the above advantages, the first optimal image reading sensitivity deriving section according to the present invention comprises a standard image reading sensitivity extraction section which extracts as a standard image reading sensitivity an image reading sensitivity having a maximum data range of the pixel data group on the basis of a pixel data group for each image reading sensitivity relating to the image pattern of the subject image read by the sensitivity adjustment image reading section, an image reading sensitivity correction section which corrects the standard image reading sensitivity on the basis of a predetermined period-increase rate, and a section which sets a value obtained by correcting the standard image reading sensitivity as the optimal image reading sensitivity. The image reading sensitivity correction section corrects the standard image reading sensitivity uniquely or by the predetermined period-increase rate on the basis of a result of comparing a mean value of the pixel data group at the standard image reading sensitivity with a predetermined reference value.

To achieve the above advantages, the second optimal image reading sensitivity deriving section according to the present invention comprises a specific data removal section which removes specific pixel data from the pixel data group for each image reading sensitivity relating to the image pattern of the subject image read by the sensitivity adjustment image reading section, an image reading sensitivity extraction section which extracts an image reading sensitivity having a maximum data range of the pixel data group as an image reading sensitivity suitable for normal reading operation of the subject image on the basis of the pixel data group for each image reading sensitivity from which the specific pixel data is removed by the specific data removal section, and a setting section which sets the image reading sensitivity extracted by the image reading sensitivity extraction section as the optimal image reading sensitivity. The specific data removal section removes, from the pixel data group obtained by the sensitivity adjustment reading section for each image reading sensitivity, pixel data having a maximum or minimum value or a plurality of pixel data sequentially from the maximum or minimum value.

Even if the individual difference of a subject or the external environment changes or pixel data contains an abnormal value, these influences can be avoided to properly set the image reading sensitivity and obtain a high-quality subject image.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 16A to 16D are conceptual views showing an example of a specific pixel data removal operation method applied to the third embodiment;

FIGS. 18A to 18E are graphs showing an example of changes in lightness data for respective rows of fingerprint image data obtained by sensitivity adjustment reading operation in the third embodiment when an abnormal pixel exists;

FIGS. 21A to 21E are graphs showing an example of changes in lightness data for respective rows of fingerprint image data obtained by specific pixel data removal operation in the third embodiment;

FIGS. 23A to 23J are timing charts showing an example of a drive control method applicable to image reading operation of a photosensor system according to the present invention;

FIGS. 24A to 24J are timing charts showing the first example of an image reading sensitivity setting method applicable to sensitivity adjustment reading operation in each embodiment;

FIGS. 25A to 25J are timing charts showing the second example of the image reading sensitivity setting method applicable to sensitivity adjustment reading operation in each embodiment;

FIGS. 28A to 28D are timing charts showing the drive control method of a double-gate photosensor system.

DETAILED DESCRIPTION OF THE INVENTION

Details of a photosensor system and drive control method thereof according to the present invention will be described on the basis of embodiments shown in the several views of the accompanying drawing. In embodiments described below, a double-gate photosensor is applied as a photosensor. However, the arrangement of the present invention is not limited to the double-gate photosensor, but is also applicable to a photosensor system using another type of photosensor.

First Embodiment

A first embodiment of a photosensor system according to the present invention will be described with reference to the several views of the accompanying drawings.

Figure 1:
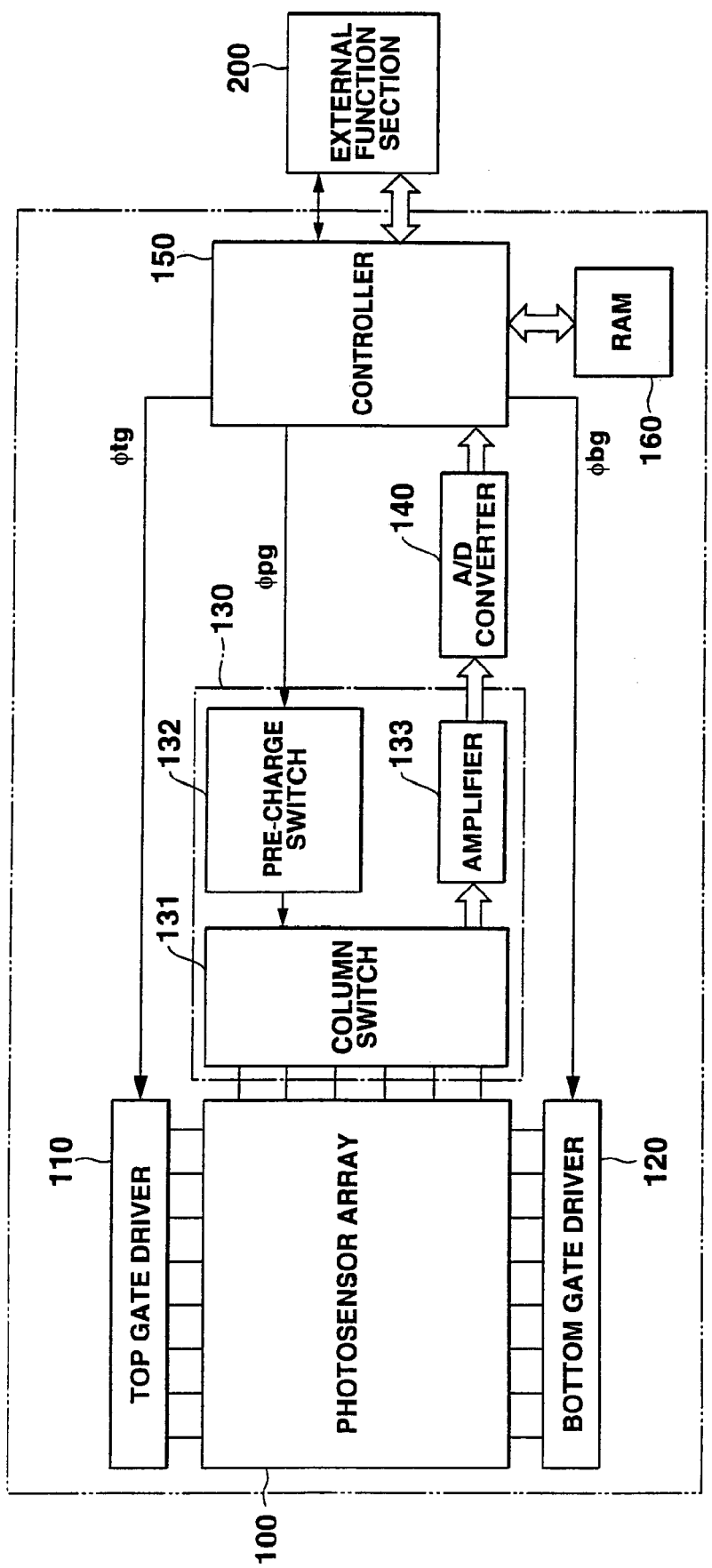
FIG. 1 is a block diagram showing an arrangement of a photosensor system according to a first embodiment of the present invention.
Figure 26A:
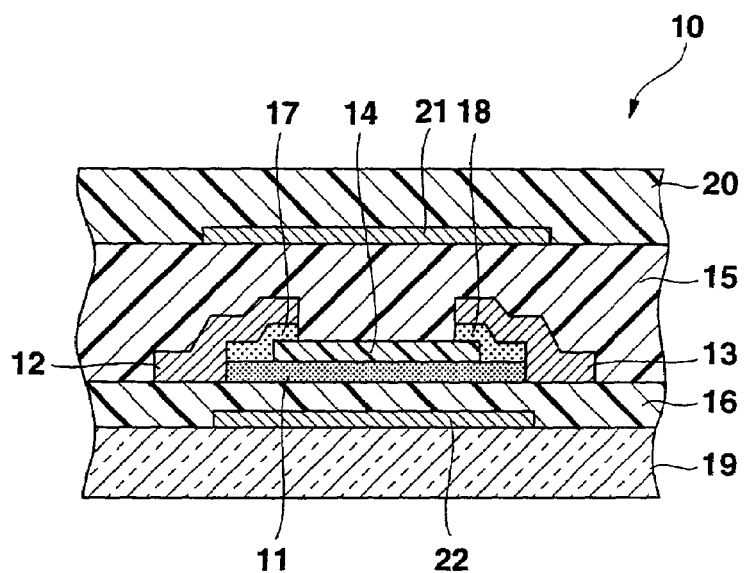
FIG. 26A is a sectional view showing the structure of a double-gate photosensor.
Figure 26B:
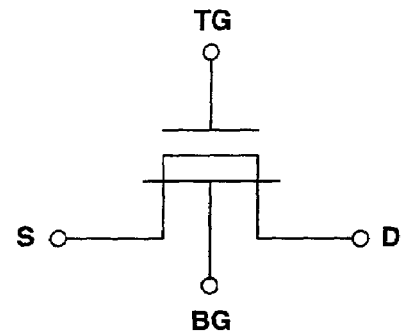
FIG. 26B is a circuit diagram showing the equivalent circuit of the double-gate photosensor.

FIG. 1 is a block diagram showing an arrangement of a photosensor system according to the first embodiment. The double-gate photosensor shown in FIG. 26A is employed as a photosensor, and the arrangement of the photosensor system shown in FIG. 27 will be referred to if necessary. The same reference numerals as in the photosensor system shown in FIG. 27 denote the same parts, and a description thereof will be simplified or omitted.

As is shown in FIG. 1, the photosensor system according to this embodiment comprises a photosensor array 100 including double-gate photosensors 10 shown in FIG. 26A that are arrayed two-dimensionally, a top gate driver 110 for applying a predetermined reset pulse to a top gate TG (FIG. 27) of each double-gate photosensor 10 at a predetermined timing, a bottom gate driver 120 for applying a predetermined readout pulse to a bottom gate BG of the double-gate photosensor 10 at a predetermined timing, an output circuit section 130 which has a column switch 131, pre-charge switch 132, and amplifier 133, applies a pre-charge voltage to the double-gate photosensor 10, and reads out a data line voltage, an analog/digital converter (to be referred to as an A/D converter hereinafter) 140 for converting the data voltage of a readout analog signal into image data of a digital signal, a controller 150 which is adopted to control the operation of reading a subject image by the photosensor array 100, and to exchange data with an external function section 200, and which controls sensitivity setting in the first embodiment, and a RAM 160 for temporarily storing acquired image data (pixel data group), and processing data or the like relating to sensitivity setting processing (to be described later).

Figure 27:
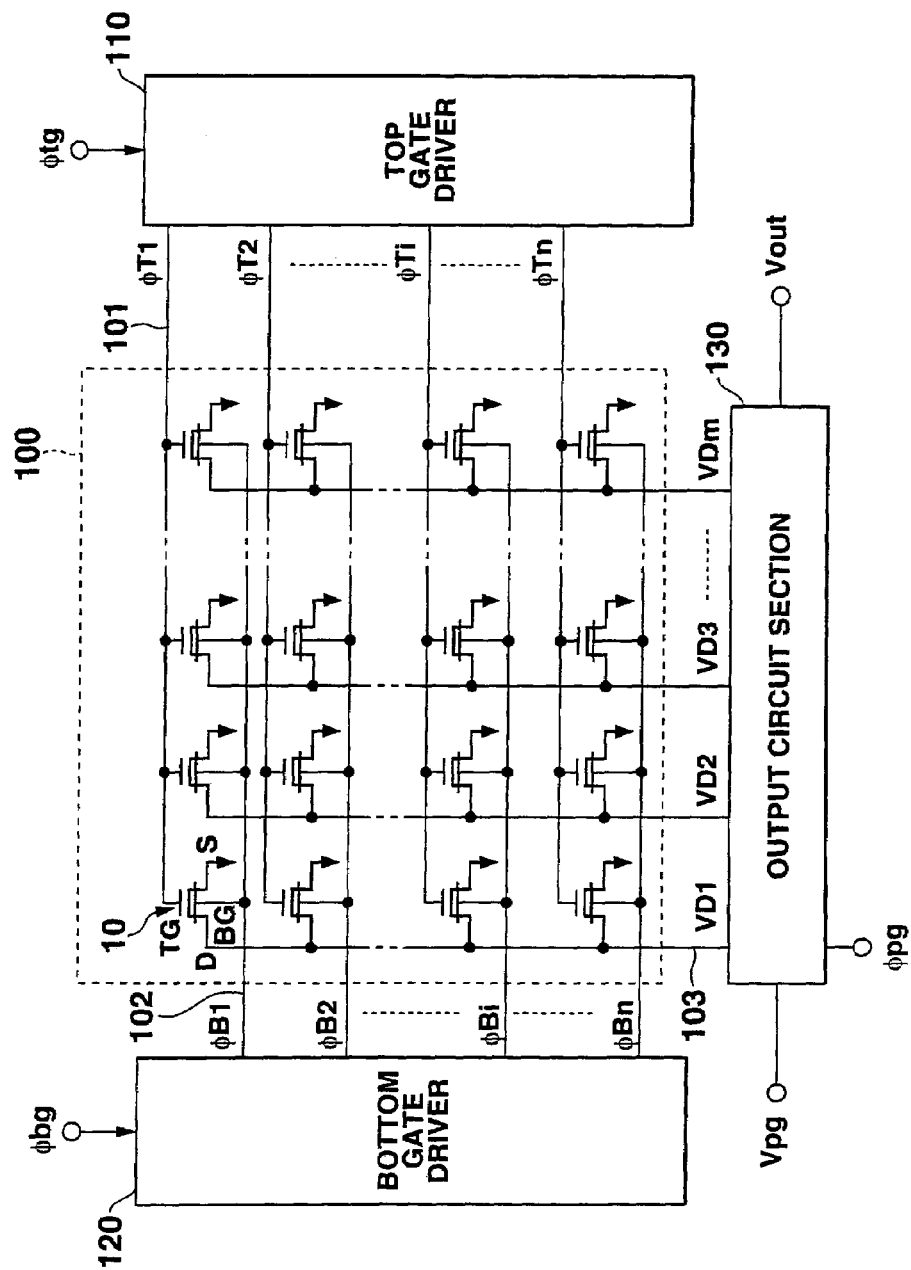
FIG. 27 is a schematic view showing a photosensor system constituted by two-dimensionally arraying double-gate photosensors.

The structures of the photosensor array 100, top gate driver 110, bottom gate driver 120, and output circuit section 130 are the same as and have the same functions as these of the photosensor system shown in FIG. 27. In addition to these members, this embodiment adopts the A/D converter 140, controller 150, and RAM 160 to enable various types of control as described below.

The controller 150 outputs predetermined control signals $\phi tg$ and $\phi bg$ to the top and bottom gate drivers 110 and 120, respectively, which, in turn, output predetermined voltages (reset pulse $\phi Ti$ and readout pulse $\phi Bi$) to the top gates TG and bottom gates BG of the double-gate photosensors 10 which constitute the photosensor array 100, respectively. The controller 150 also outputs a predetermined control signal $\phi pg$ to the pre-charge switch 132 to apply a pre-charge voltage Vpg to the drain terminals D of the double-gate photosensors 10. The controller 150 controls an operation of detecting a drain voltage VD corresponding to the amount of charges accumulated in the double-gate photosensors 10 in correspondence with the image pattern of a read subject. An output voltage $V_{out}$ read out by the drain driver 130 is converted into a digital signal via the A/D converter 140, and this digital signal is input as an image output signal to the controller 150. The controller 150 has a function of executing predetermined image processing for the image output signal, and writing or reading the processed signal into or from the RAM 160. The controller 150 also functions as an interface with an external function section 200 that executes predetermined processing such as image data identification, modification, and the like.

The controller 150 has another function of changing and controlling control signals to be output to the top and bottom gate drivers 110 and 120 to set an optimal reading sensitivity for reading a subject image in accordance with environments such as an illuminance of external light, i.e., an optimal charge accumulating period for the double-gate photosensors 10.

The external function section 200 has a function of executing image processing (collation, modification, or the like) for, e.g., image data acquired by the photosensor system in accordance with the application purpose of the photosensor system. The external function section 200 also has a function of monitoring the operation state of the photosensor system or controller 150 and outputting a calculation processing result or the like. Further, the external function section 200 also functions as an input/output interface for inputting and setting various parameters such as the default value of a charge accumulating period Ta, and a period-increase rate and mean compare value (to be described later) in order to define the operation state, calculation processing, and the like.

The detailed arrangement and operation of the controller applied to the photosensor system described above will be explained with reference to the several views of the accompanying drawings.

Figure 2:
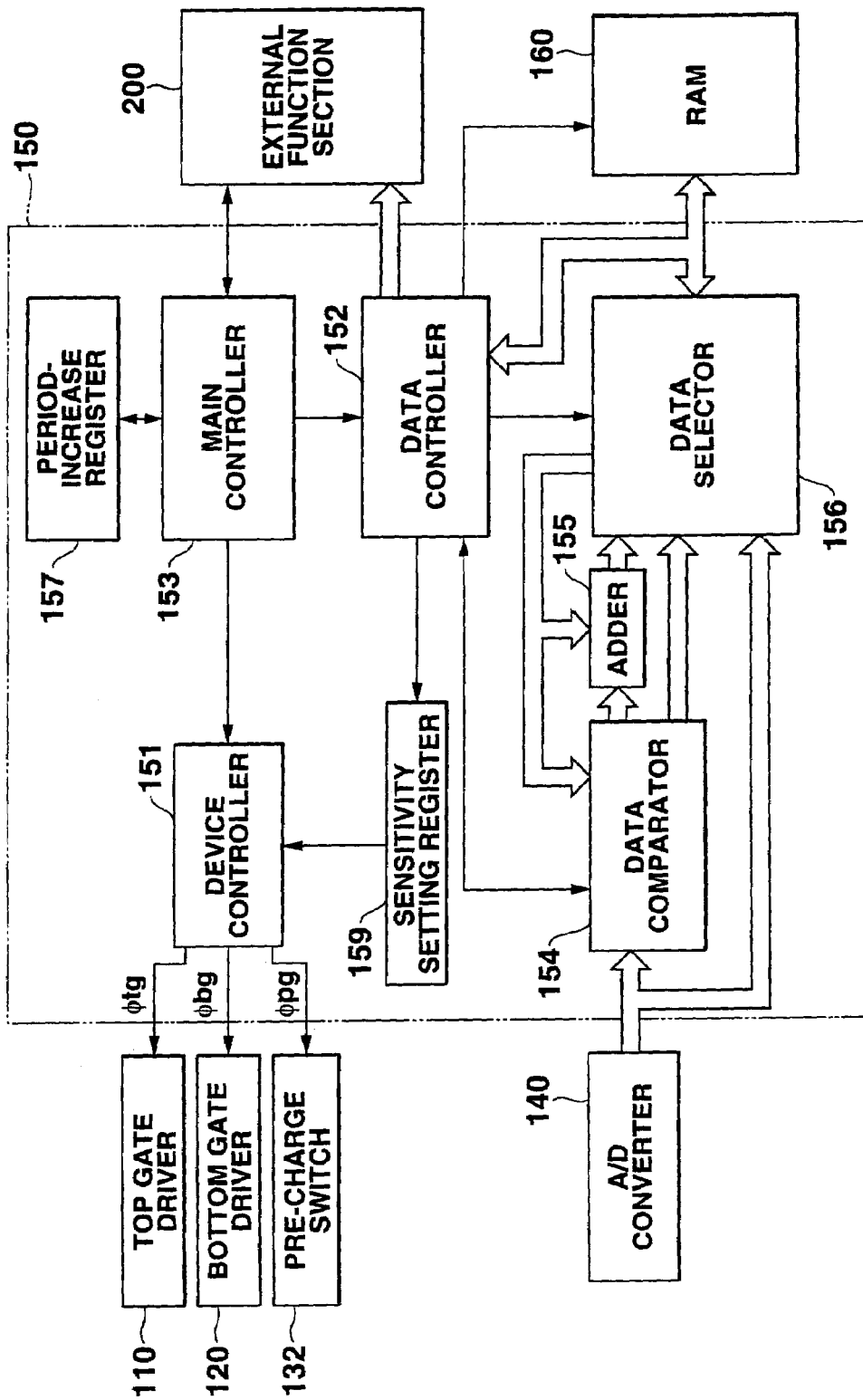
FIG. 2 is a block diagram showing an arrangement of a controller applied to the first embodiment.

FIG. 2 is a block diagram showing an arrangement of the controller applied to the photosensor system according to the first embodiment.

As shown in FIG. 2, the controller 150 in this embodiment comprises a device controller 151 for controlling the operations of the top gate driver 110, bottom gate driver 120, and pre-charge switch 132, a data controller 152 for managing various data such as image data, write data, and readout data to the RAM 160, and a main controller 153 which supervises the controllers 151 and 152 and interfaces with the external function section 200.

The controller 150 further comprises: a data comparator 154 for extracting maximum and minimum values by comparing the sizes of lightness data in pixel data contained in an image output signal on the basis of image data input as a digital signal from the photosensor array 100 via the A/D converter 140, and for extracting a maximum dynamic range from calculated dynamic ranges; an adder 155 for calculating a dynamic range (data range) from the difference between the maximum and minimum values of pixel data extracted by the data comparator 154; a data selector 156 for receiving image data and processing data processed via the A/D converter 140, data comparator 154, and adder 155, and switching between write/readout of these data in/from the RAM 160, re-input of these data to the data comparator 154 and adder 155, and output of these data to the external function section 200 via the data controller 152 if necessary; a period-increase register 157 which holds a period-increase rate used to execute period-increase correction (to be described later) by the main controller 153 for an image reading sensitivity which is extracted by the data comparator 154, adder 155, and data selector 156 and corresponds to a maximum dynamic range; and a sensitivity setting register 159 for setting the timings of control signals φtg and φbg to be output from the device controller 151 to the top and bottom gate drivers 110 and 120 on the basis of a control signal output from the data controller 152 based on the image reading sensitivity (optimal image reading sensitivity) having undergone period-increase correction.

Processing operation by the above-mentioned controller will be explained with reference to the several views of the accompanying drawings.

Figure 3:
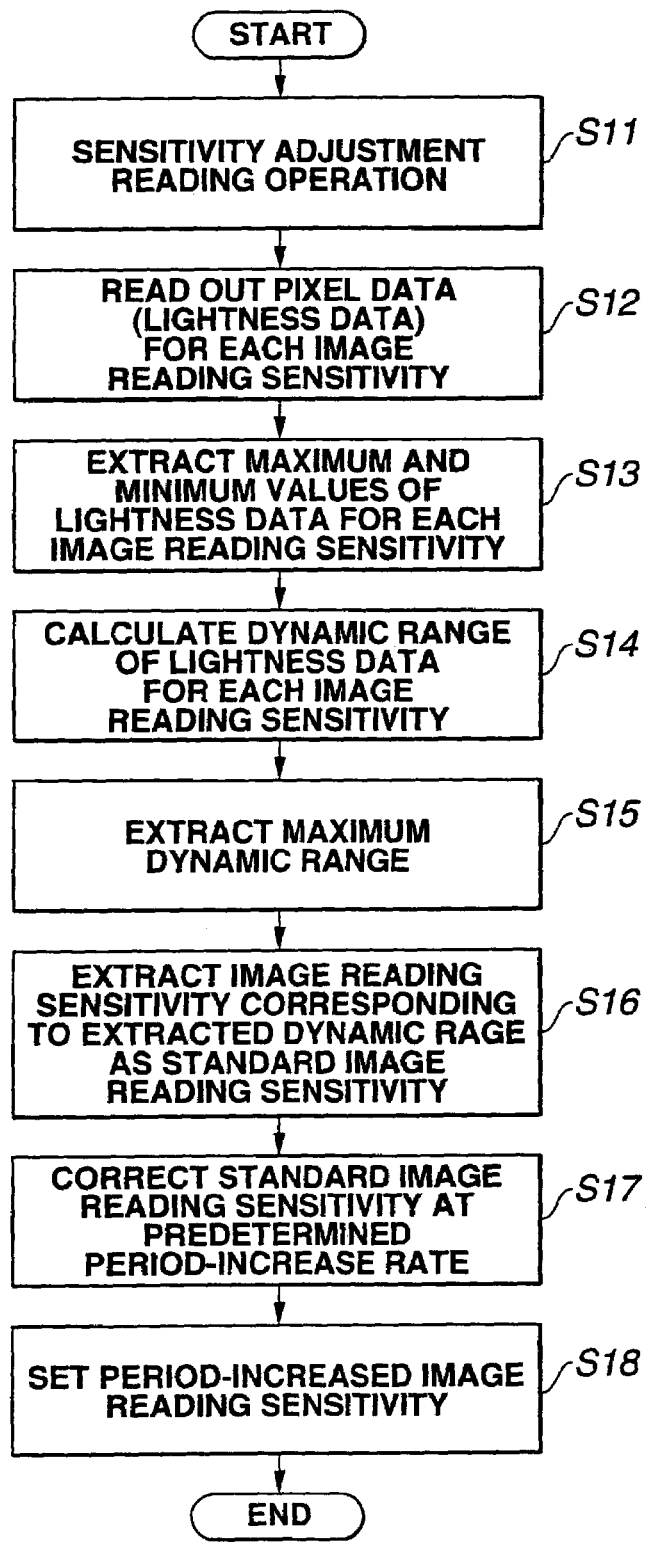
FIG. 3 is a flow chart showing an example of sensitivity adjustment/setting processing executed by the controller according to the first embodiment.
Figure 4:
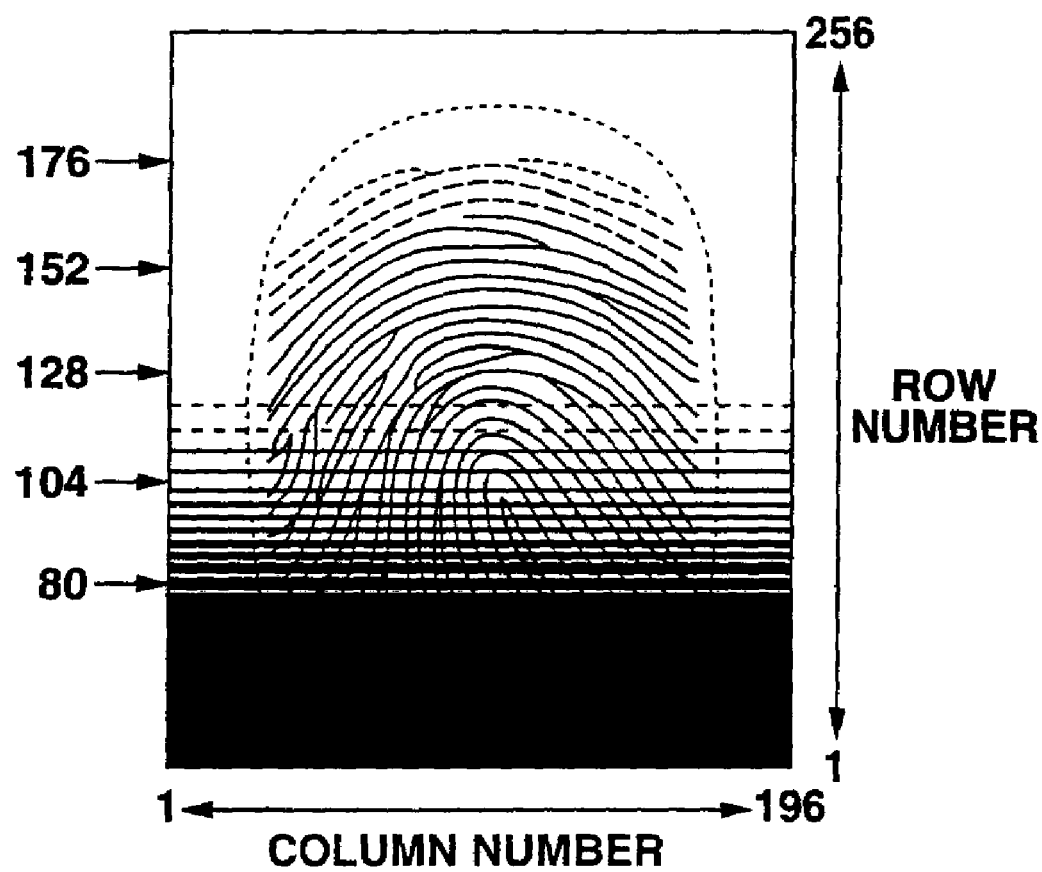
FIG. 4 is a view showing an example of image data when a fingerprint image is read in the first embodiment.

FIG. 3 is a flow chart showing an example of sensitivity adjustment/setting processing executed by the controller applied to the photosensor system according to the first embodiment. FIG. 4 is a view showing an example of fingerprint image data when the photosensor system according to this embodiment is applied to a fingerprint reading apparatus and a fingerprint is read while the image reading sensitivity is changed stepwise every row of the photosensor array in sensitivity adjustment reading operation applied to sensitivity adjustment processing. FIGS. 5A to 5E are graphs showing changes in lightness data of respective rows in fingerprint image data obtained by sensitivity adjustment reading operation. FIGS. 6A and 6B are tables showing the relationship between the dynamic range (data range) of lightness data for respective rows obtained by sensitivity adjustment reading operation, and a row number vs. image reading sensitivity correspondence table. The processing operation will be explained with reference to the arrangement of the photosensor system shown in FIGS. 1 and 2. As for various data such as lightness data, its dynamic range, and the charge accumulating period, only data of representative 80th, 104th, 128th, 152nd, and 176th rows are illustrated.

(Step S11)

As shown in FIG. 3, the main controller 153 starts sensitivity adjustment reading operation prior to normal reading operation of a subject image. The main controller 153 controls the sensitivity setting register 159 to set an image reading sensitivity for sensitivity adjustment reading operation via the data controller 152. The main controller 153 reads a subject image for the purpose of sensitivity adjustment.

In general, this sensitivity adjustment reading operation is performed immediately before normal image reading operation. However, sensitivity adjustment reading operation is not necessarily executed at a timing prior to normal image reading operation, and may be independently performed at a different timing from normal image reading operation, for example, when an image reading sensitivity must be set.

Similar to normal image reading operation, sensitivity adjustment reading operation is achieved by executing a series of processes: reset operation→charge accumulating operation→pre-charge operation→reading operation for double-gate photosensors which constitute the photosensor array. At this time, the charge accumulating period is changed stepwise by repetitively executing pre-charge operation and reading operation at predetermined timings for respective rows such that a higher image reading sensitivity is set for a larger row number in the photosensor array 100 in which double-gate photosensors are arrayed in a matrix of 256 rows×196 columns, as shown in FIG. 4. Image data read at different image reading sensitivities for respective rows are acquired by one reading operation of a subject image. An image reading sensitivity for each row is stored in the form of a table (row number vs. image reading sensitivity correspondence table) in the RAM 160 in correspondence with the row number. A longer charge accumulating period and higher image reading sensitivity are set for a larger row number. A ridge/valley pattern of a fingerprint is read as a faint (light) image or an almost invisibly bright image under the influence of external light (upward in FIG. 4). On the other hand, a shorter charge accumulating period and lower image reading sensitivity are set for a smaller row number. The ridge/valley pattern of the fingerprint is read as a blackish image or an almost invisibly dark image (downward in FIG. 4). Note that a detailed method of setting an image reading sensitivity in sensitivity adjustment reading operation will be described later.

In this embodiment, the image reading sensitivity is changed every row of the photosensor array in sensitivity adjustment reading operation. The present invention is not limited to this, and the image reading sensitivity may be changed stepwise, e.g., every plurality of rows. Alternatively, a subject image may be read by one frame of the photosensor array every time the image reading sensitivity is changed. In short, image data suffices to be obtained at different image reading sensitivities for one subject.

(Step S12)

Image data read by the above-described sensitivity adjustment reading operation is converted into a digital signal via the amplifier 133 of the drain driver 130 and the A/D converter 140. The digital signal is input to the data comparator 154 as pixel data (lightness data) of each image reading sensitivity that corresponds to the bright/dark pattern of the subject image.

Figure 5C:
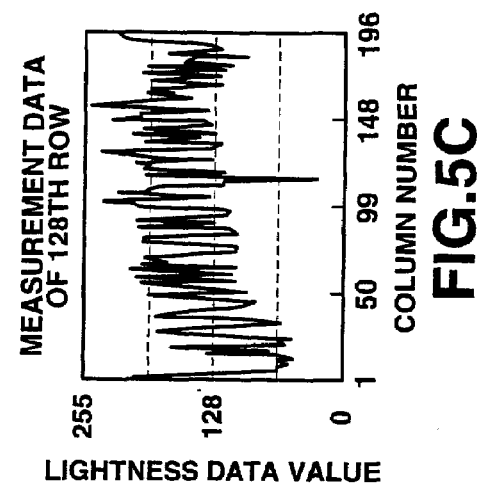
FIGS. 5A to 5E are graphs showing changes in lightness data of respective rows in fingerprint image data obtained by sensitivity adjustment reading operation in the first embodiment.
Figure 5B:
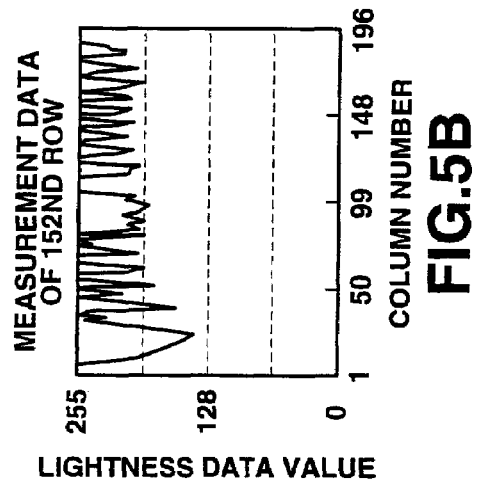
Figure 5E:
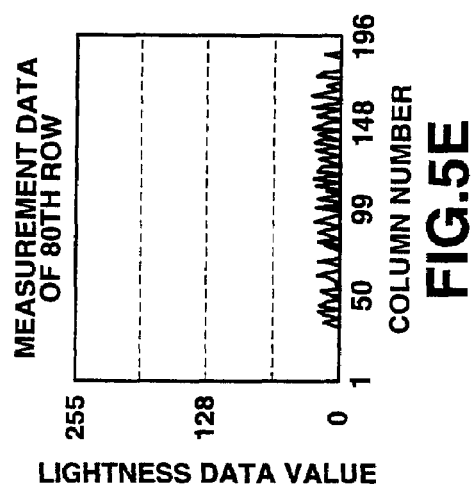
Figure 5A:
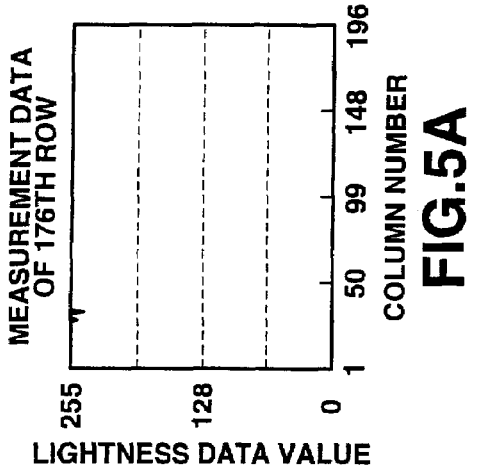

More specifically, as shown in FIGS. 5A to 5E, 256 gray levels are set between white and black on the subject image. Voltage changes in drain voltage VD in, e.g., the 176th, 152nd, 128th, 104th, and 80th rows in the photosensor array 100 as shown in FIG. 4 are converted into lightness data values ranging from 0 to 255, which are graphed. In the 176th row, as shown in FIG. 5A, the sensitivity is set high, so that lightness data substantially converges to the upper limit (255) and hardly provides any information as image data. In the 152nd row, as shown in FIG. 5B, the sensitivity is set relatively high, lightness data reaches the upper limit on some columns, and all the ridge/valley (bright/dark) patterns of image data cannot be read.

Figure 5D:
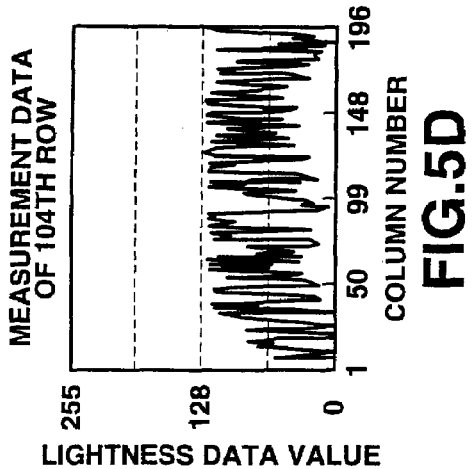
Figures 6A, 6B:
FIGS. 6A and 6B are tables showing an example of the relationship between the dynamic range of lightness data for respective rows obtained by sensitivity adjustment reading operation in the first embodiment, and a row number vs. image reading sensitivity correspondence table.

To the contrary, in the 128th row, as shown in FIG. 5C, lightness data does not reach either the upper limit (255) or lower limit (0) on all the columns, and is distributed between the upper and lower limits. In the 104th row, as shown in FIG. 5D, the sensitivity is set relatively low, and lightness data is distributed between the upper and lower limits. However, lightness data reaches the lower limit on some columns, and all the ridge/valley patterns of image data cannot be read. In the 80th row, as shown in FIG. 5E, the sensitivity is set low, so that lightness data substantially converges to the lower limit and hardly provides any information as image data.

(Steps S13 & S14)

Lightness data (pixel of highest gray level) representing a maximum value and lightness data (pixel of lowest gray level) representing a minimum value are extracted from the lightness data input to the data comparator 154 for each image reading sensitivity, and output to the adder 155.

As shown in FIG. 6A, lightness data (pixel of highest gray level) representing a maximum value and lightness data (pixel of lowest gray level) representing a minimum value are extracted for each row from the lightness data input to the data comparator 154, and output to the adder 155.

The adder 155 calculates the difference between the maximum and minimum values of lightness data for each row, thus obtaining a dynamic range for each image reading sensitivity. The adder 155 stores the dynamic range in the RAM 156 via the data selector 160. The adder 155 executes dynamic range calculation processing for all the rows or a predetermined number of rows.

(Step S15)

Dynamic ranges for respective image reading sensitivities stored in the RAM 160 are read out via the data selector 156, and input to the data comparator 154. The data comparator 154 extracts a maximum value from dynamic ranges for respective image reading sensitivities.

More specifically, maximum and minimum values are extracted as numerical data on the basis of distribution changes in lightness data of respective rows shown in FIGS. 5A to 5E. Dynamic ranges are calculated from the differences between the maximum and minimum values. As shown in FIG. 6A, the data range depends on the minimum value in the 176th and 152nd rows because lightness data reaches the upper limit and its maximum value is fixed to 255. In the 104th and 80th rows, the data range depends on the maximum value because lightness data reaches the lower limit and its minimum value is fixed to 0.

In the 128th row, the dynamic range depends on the difference between the maximum and minimum values of lightness data because the lightness data does not reach either the upper or lower limit. The 128th row provides a larger data range than those of the 176th, 152nd, 104th, and 80th rows. In other words, lightness data of the 128th row is image data with a good contrast corresponding to the ridge/valley pattern of a fingerprint, and an optimal image reading sensitivity can be determined to be set.

(Step S16)

An image reading sensitivity corresponding to the maximum dynamic range is extracted and set as a standard image reading sensitivity.

More specifically, as shown in FIG. 6B, an image reading sensitivity set for the 128th row, i.e., the charge accumulating period $T_{128}$ of the double-gate photosensor is extracted by looking up a row number vs. image reading sensitivity correspondence table stored in the RAM 160 on the basis of a row number (128th row) at which the dynamic range maximizes.

(Step S17)

The main controller 153 controls the data controller 152 so as to execute processing of correcting the image reading sensitivity (standard image reading sensitivity) on the basis of a predetermined period-increase rate set in advance in the period-increase register 157.

For example, the image reading sensitivity which is set for the 128th row and exhibits a maximum dynamic range corresponds to the charge accumulating period $T_{128}=91.2$ ms, and the period-increase rate set in advance in the period-increase register 157 is 32%. In this case, a charge accumulating period used for rewrite of the sensitivity setting register 159 is a 32%-period-increased numerical value:

$$91.2 \times (1+0.32) \approx 120 \text{ ms} \tag{2}$$

This period-increase correction processing increases by 1.32 times the image reading sensitivity of the row which is extracted in step S16 and exhibits the maximum dynamic range. The charge accumulating period is prolonged by 1.32 times so as to increase the amount of excitation light (visible light) incident on each double-gate photosensor. The period-increase rate of about 32% is a numerical value which has been found as a result of various experiments by the present inventors to be able to correct the image reading sensitivity to an optimal one which can relatively accurately read a fingerprint even if the subject is a keratinized finger (to be described later) in the sensitivity adjustment apparatus and method according to the first embodiment.

(Step S18)

The data controller 152 controls rewrite of the sensitivity setting register 159 to set the corrected image reading sensitivity (charge accumulating period). Sensitivity adjustment processing based on sensitivity adjustment reading operation ends.

After that, normal image reading operation of a subject image is executed based on the optimal image reading sensitivity (charge accumulating period) determined by the above-described sensitivity adjustment reading operation and image reading sensitivity adjustment operation.

The read image of a fingerprint and the image reading sensitivity when the sensitivity adjustment apparatus and method of the photosensor system are applied to a fingerprint reading apparatus will be exemplified with reference to the several views of the accompanying drawing. A case wherein no period-increase processing is executed will also be explained for comparison in order to show the effectiveness of period-increase correction processing in the sensitivity adjustment method according to the first embodiment.

Figure 7A:
FIGS. 7A and 7B are a view showing a fingerprint image, and a graph showing an example of changes in lightness data of respective columns at an image reading sensitivity when normal image reading operation is performed at an image reading sensitivity obtained without executing period-increase correction processing in the first embodiment.
Figure 7B:
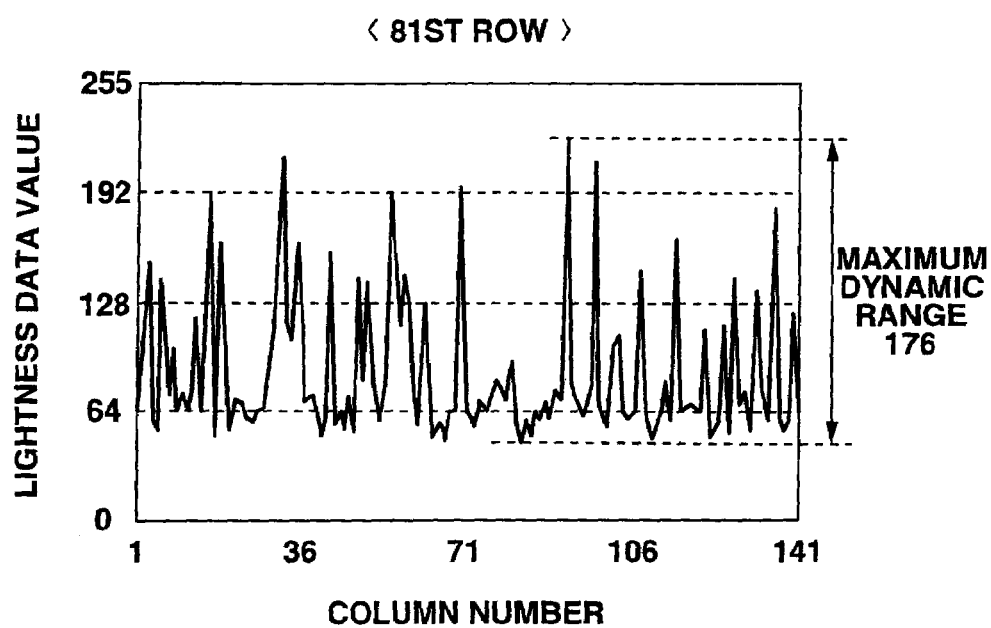
Figure 8A:
FIGS. 8A and 8B are a view showing a fingerprint image, and a graph showing an example of changes in lightness data of respective columns at an image reading sensitivity when normal image reading operation is performed at an image reading sensitivity obtained by executing period-increase correction processing in the first embodiment.
Figure 8B:
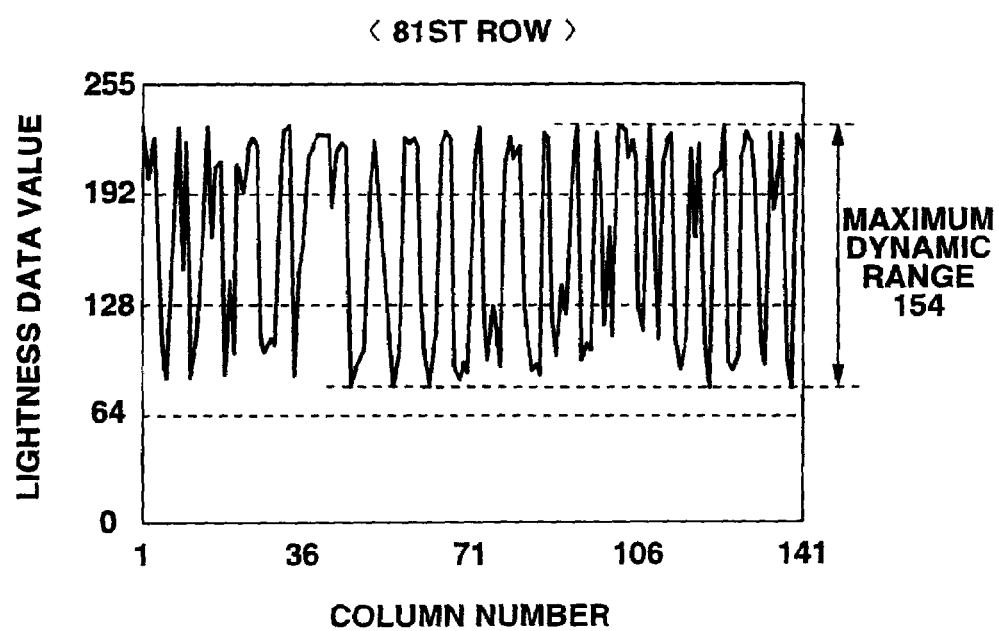

FIGS. 7A and 7B are a view showing the read image of a fingerprint, and a graph showing lightness data of respective columns at an image reading sensitivity when normal image reading operation is performed at the standard image reading sensitivity without executing period-increase correction processing of the first embodiment in the sensitivity adjustment method of the photosensor system. FIGS. 8A and 8B are a view showing the read image of a fingerprint, and a graph showing lightness data of respective columns at an image reading sensitivity when the standard image reading sensitivity undergoes period-increase correction processing of the first embodiment in the sensitivity adjustment method of the photosensor system and normal image reading operation is performed at the resultant image reading sensitivity. FIGS. 7A and 8A show rough subject images when reading operation is executed based on each predetermined image reading sensitivity. The ridge portion (projecting region) of a fingerprint is illustrated in white (or whitish), and the valley line (recessed region) of the fingerprint is illustrated in black (or blackish).

A case wherein no period-increase processing is done in the above sensitivity adjustment method will be explained.

As described in "Description of the Related Art", an appropriate image reading sensitivity may not be set in accordance with the state of the skin surface layer of a finger serving as a subject in an application of the photosensor system to a finger reading apparatus. The skin surface layer of a finger often keratinizes, the amount of light reflected by the ridge portion of the fingerprint increases, and the brightness is observed locally high. Compared to a case wherein the fingerprint of a finger with a non-keratinized skin is read, a relatively large dynamic range can be obtained at a relatively low image reading sensitivity within a short charge accumulating period. An image reading sensitivity (standard image reading sensitivity) corresponding to a maximum dynamic range is extracted as an optimal image reading sensitivity on the basis of the read fingerprint image data. In this case, a lower image reading sensitivity than an originally optimal image reading sensitivity, i.e., a shorter charge accumulating period than an originally optimal charge accumulating period is extracted and set. If normal fingerprint reading operation is executed based on this image reading sensitivity, a subject image is read as a relatively dark image and the ridge portion in the image tends to be discontinuous, as shown in FIG. 7A, because the charge accumulating period is set shorter than an originally optimal charge accumulating period. The distribution characteristic of lightness data of an arbitrary row (e.g., 81st row) was examined for the subject image, and found to exhibit a lightness data distribution with a large dynamic range, as shown in FIG. 7B. This is because the presence of pixels (columns) having extremely high maximum values of lightness data under the influence of the ridge portion of a keratinized skin surface layer. This distribution does not accurately correspond to the original image pattern of the fingerprint. Hence, a fingerprint cannot be accurately read, decreasing the precision of fingerprint collation processing in the external function section.

To the contrary, the sensitivity adjustment apparatus and method of the photosensor system according to the first embodiment execute correction processing based on a predetermined period-increase rate (e.g., about 30%) for an image reading sensitivity (standard image reading sensitivity) which provides a maximum dynamic range and is obtained by sensitivity adjustment reading operation and image reading sensitivity adjustment operation for fingerprint image data of a finger whose skin surface layer is keratinized. A higher image reading sensitivity, i.e., a longer charge accumulating period is set in comparison with the image shown in FIG. 7A. Accordingly, an image reading sensitivity closer to an originally optimal image reading sensitivity is set.

By executing normal fingerprint reading operation on the basis of the corrected image reading sensitivity, a subject image is read as an image having a proper brightness, and a high-quality image having almost no discontinuous ridge portion can be attained, as shown in FIG. 8A. The distribution characteristic of lightness data of an arbitrary row (e.g., 81st row) was examined for the subject image, and found to exhibit a lightness data distribution with a relatively large dynamic range, as shown in FIG. 8B. In addition, extreme lightness data under the influence of a keratinized skin surface layer was observed at neither maximum nor minimum values. A stable image accurately corresponding to the original image pattern of the fingerprint was obtained. As a result, fingerprint collation processing can be executed at high precision in the external function section 200.

According to the sensitivity adjustment apparatus and method of the first embodiment, sensitivity adjustment reading operation is performed using an actual subject prior to normal image reading operation, while the image reading sensitivity is changed stepwise for each row. A row in an optimal image reading state is easily determined based on the dynamic range of lightness data of each row, and an image reading sensitivity (standard image reading sensitivity) set for the determined row is extracted. Then, correction processing based on a predetermined period-increase rate is executed to set an optimal image reading sensitivity. Even when the brightness of a subject changes depending on changes in environmental illuminance, or a fluctuation factor or trend exists due to the individual difference of a subject (individual difference such as gender or age) or external environment (temperature, humidity, or the like), sensitivity adjustment processing is uniquely executed by a simple method to greatly suppress the influence of the environmental illuminance of external light or keratinization of a skin surface layer. An optimal image reading sensitivity can be set, and a subject image can be accurately read by normal image reading operation.

In this embodiment, sensitivity adjustment processing has been described for only the 176th, 152nd, 128th, 104th, and 80th rows shown in FIGS. 5A to 5E as representative rows. Sensitivity adjustment processing may be executed for all the 256 rows which constitute the photosensor array 100 or for specific rows (e.g., every 24 rows in FIGS. 5A to 5E).

When sensitivity adjustment processing is executed for all the rows, a more optimal image reading sensitivity can be extracted from image reading sensitivities set for respective rows. If sensitivity adjustment processing is executed for only specific rows, the number of data subjected to a series of processing operations can be greatly decreased to reduce the processing burden on the controller 150 and shorten the processing time. Sensitivity adjustment reading operation can quickly shift to normal reading operation of a subject image.

Figure 15A:
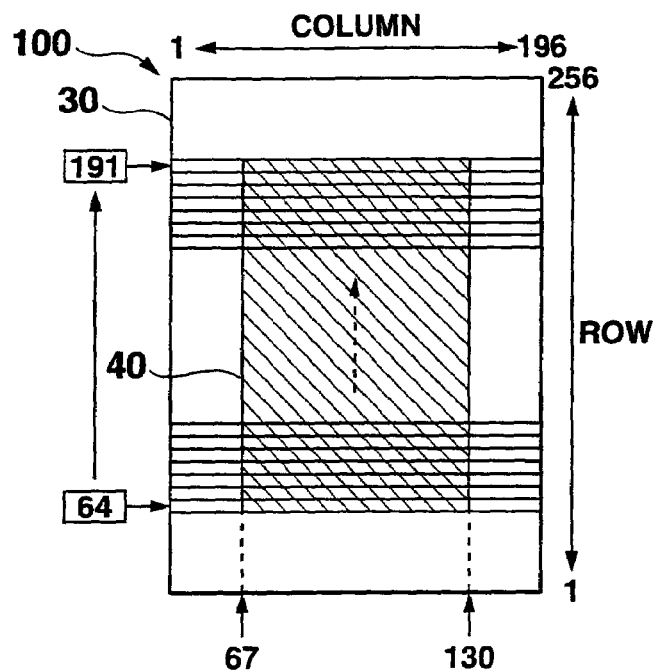
FIGS. 15A and 15B are conceptual views showing another target region and another example of reading operation in sensitivity adjustment reading operation according to the third embodiment.
Figure 15B:
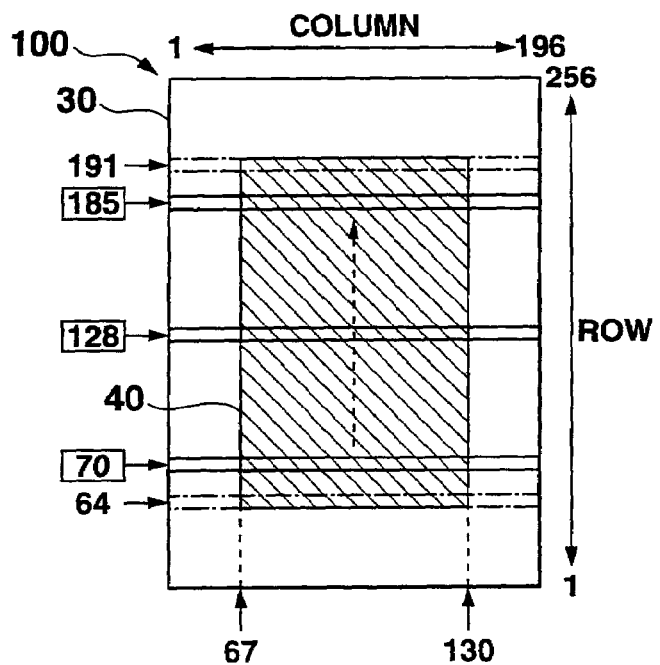

In this embodiment, a subject image (fingerprint image) is read by the entire sensing surface of the photosensor array 100 in sensitivity adjustment reading operation. The present invention is not limited to this, and sensitivity adjustment processing may be done by reading a subject image only in a detection region 40 formed from a predetermined restricted region, as shown in FIGS. 15A and 15B in the third embodiment (to be described later). In this case, the reading time can be shortened, and the number of data subjected to processing operation can be further decreased to shorten the processing time. Sensitivity adjustment reading operation can more quickly shift to normal reading operation of a subject image.

In the above-mentioned embodiment, of lightness data of respective rows acquired by sensitivity adjustment reading operation, an image reading sensitivity set for a row having a maximum dynamic range uniquely undergoes period-increase correction processing on the basis of a predetermined period-increase rate set in advance in the period-increase register 157. However, the present invention is not limited to this.

For example, the period-increase rate set in the period-increase register 157 may be arbitrarily set by input operation outside the photosensor system (or controller 150). This is achieved by operating the input/output interface device (not shown) of the external function section 200, inputting an arbitrary period-increase rate as numerical data, and rewriting the period-increase register 157.

As an example to which the arrangement of arbitrarily rewriting the period-increase value is suitable applied, the photosensor system is applied to a fingerprint reading apparatus. In this arrangement, when the type of subject is restricted or specified to a certain degree, and the age or gender of an individual serving as a subject or an external environment such as a temperature or humidity is grasped in advance, a proper period-increase rate is set in accordance with such a fluctuation factor or trend every time or by inputting a numerical value in advance. A more optimal image reading sensitivity can be set while the influence of the individual difference or external environment is suppressed. A subject image can be accurately read.

Correction based on the period-increase rate is always executed in the first embodiment, but the present invention is not limited to this. For example, in an arrangement in which the photosensor system is applied to a fingerprint reading apparatus, an optimal image reading sensitivity is extracted and set without applying correction processing based on the period-increase rate. Then, normal subject image reading operation is done to perform fingerprint collation processing. If the result is rejected, correction processing based on the period-increase rate is applied to correct the image reading sensitivity. At the corrected image reading sensitivity, normal subject image reading operation is executed again to perform fingerprint collation processing. In this case, normal subject image reading operation can be quickly achieved without any processing time of correction processing unless the skin state of a subject (fingerprint) is keratinized.

Second Embodiment

The second embodiment of a photosensor system according to the present invention will be described with reference to the several views of the accompanying drawing.

Figure 9:
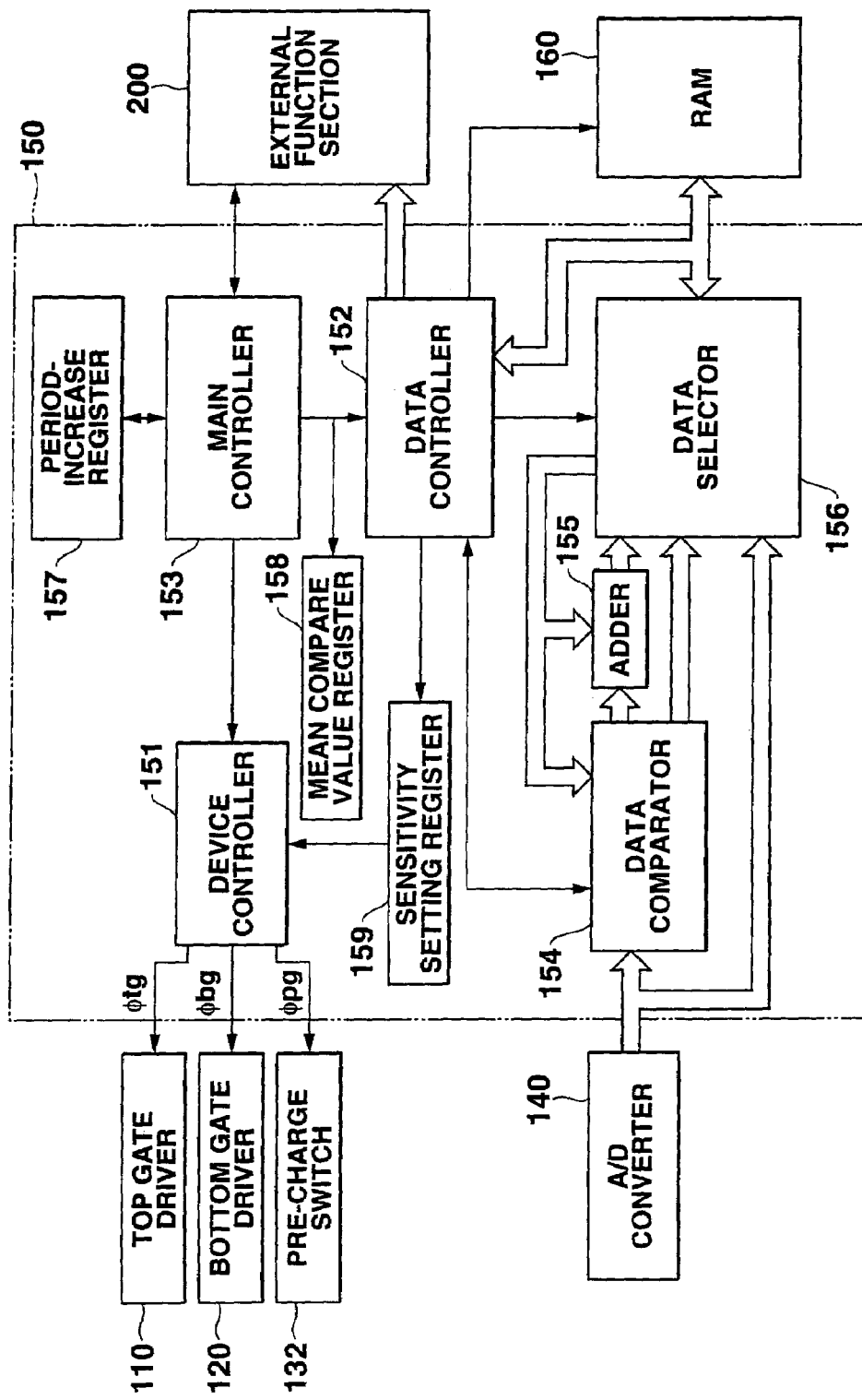
FIG. 9 is a block diagram showing an arrangement of a controller applied to a second embodiment.

FIG. 9 is a block diagram showing an arrangement of a controller applied to the photosensor system according to the second embodiment. The same reference numerals as in the first embodiment shown in FIG. 2 denote the same parts, and a description thereof will be simplified or omitted.

Similar to the sensitivity adjustment method according to the first embodiment, the second embodiment extracts the image reading sensitivity of a row having a maximum dynamic range in a lightness data distribution obtained by sensitivity adjustment reading operation. Then, whether to execute period-increase correction processing for the extracted image reading sensitivity is determined, and a more optimal image reading sensitivity is set.

As shown in FIG. 9, a controller 150 in the second embodiment comprises a device controller 151, data controller 152, main controller 153, data comparator 154, adder 155, data selector 156, period-increase register 157, and sensitivity setting register 159, all of which have the same arrangements as those in the first embodiment shown in FIG. 2. In addition, the controller 150 comprises a mean compare value register 158 which holds a mean compare value serving as a reference value for determining whether to execute period-increase correction of the main controller 153 for an image reading sensitivity which is extracted by the data comparator 154, adder 155, and data selector 156 and corresponds to a maximum dynamic range. In the second embodiment, the mean compare value held in the mean compare value register 158 is uniquely set based on a maximum dynamic range out of a lightness data distribution obtained by sensitivity adjustment reading operation of a subject image.

Processing operation by the controller will be explained with reference to the several views of the accompanying drawings.

Figure 10:
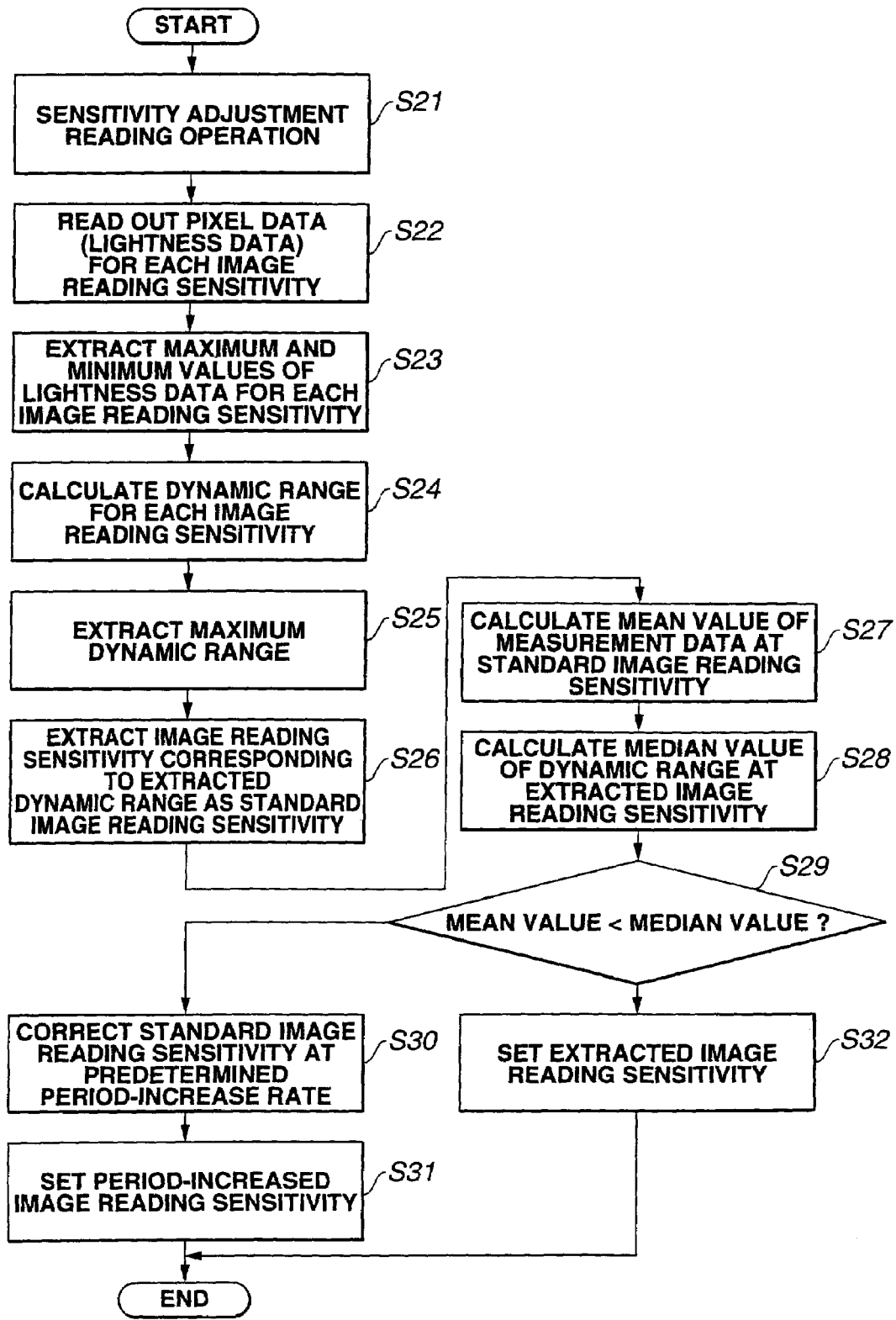
FIG. 10 is a flow chart showing an example of sensitivity adjustment/setting processing executed by the controller according to the second embodiment.

FIG. 10 is a flow chart showing an example of sensitivity adjustment/setting processing executed by the controller applied to the photosensor system according to the second embodiment. A description of the same processing steps as those in the first embodiment shown in FIG. 3 will be simplified or omitted.

(Steps S21 to S26)

As shown in FIG. 10, similar to steps S11 to S16 in the first embodiment, different image reading sensitivities are set for respective rows at a timing prior to normal reading operation of a subject. Sensitivity adjustment subject image reading operation is executed to obtain pixel data (lightness data) of each image reading sensitivity that corresponds to the bright/dark pattern of the subject image. Lightness data representing maximum and minimum values are extracted from the lightness data for each image reading sensitivity (e.g., for each row). The difference between the maximum and minimum values is calculated to attain a dynamic range for each image reading sensitivity, and the dynamic range is stored in a RAM 160. A maximum value is extracted from dynamic ranges for respective image reading sensitivities that are stored in the RAM 160, and a corresponding image reading sensitivity (charge accumulating period) is extracted.

(Steps S27 & S28)

The main controller 153 controls the data controller 152 so as to calculate the mean value of pixel data (lightness data) corresponding to the image reading sensitivity at which the dynamic range maximizes, i.e., the image reading sensitivity extracted in step S26, and to calculate the median value (mean compare value) of the dynamic range.

The calculated mean value of lightness data is temporarily stored in the RAM 160 via the data selector 156. The median value of the dynamic range is held in the mean compare value register 158 via the data selector 156 and data controller 152.

(Step S29)

The main controller 153 controls the data controller 152 so as to execute processing of comparing the mean value of lightness data which is calculated in step S27 and stored in the RAM 160 with the median value of the maximum dynamic range which is calculated in step S28 and held in the mean compare value register 158.

If a keratinized finger is read as a subject, the amount of light reflected by the ridge portion of the keratinized finger may increase, and the brightness may be observed locally high, as shown in FIG. 7B. In this case, lightness data appears locally high. For this reason, lightness data of a row determined to have a maximum dynamic range under the influence of keratinization may be merely a set of small lightness data except locally high data. From this, when the mean value of lightness data is relatively small, even a row having a maximum dynamic range is determined to be a set of small lightness data under the influence of keratinization. An image reading sensitivity corresponding to this row can be determined to be lower than an originally optimal image reading sensitivity.

Whether the mean value of lightness data in a row exhibiting a maximum dynamic range is small or large is determined by comparing the mean value of lightness data with the median value of the dynamic range or comparing the sum of lightness data of this row with the product of the median value of the dynamic range and the number of columns.

If the mean value of lightness data (or the sum of lightness data) is smaller than the median value of the dynamic range (or the product of the median value and the number of columns), the row can be determined to have an improper lightness data distribution under the influence of keratinization. If the means value is larger, the row can be determined to have a proper lightness data distribution free from any influence of keratinization. The following processing operation is executed based on this determination result.

(Steps S30 & S31)

If the mean value of lightness data at an image reading sensitivity having a maximum dynamic range is determined in step S29 to be smaller than the median value of the dynamic range, the main controller 153 determines that the lightness data distribution at this image reading sensitivity is improper. The main controller 153 controls the data controller 152 so as to execute period-increase correction processing for the image reading sensitivity having the dynamic range on the basis of a predetermined period-increase rate set in advance in the period-increase register 157 or arbitrarily input and set via an external function section 200 or the like.

A value corrected by increasing the image reading sensitivity, which is extracted in step S26 and has the maximum dynamic range, by the period-increase rate in period-increase correction processing is set as an image reading sensitivity. That is, the charge accumulating period is prolonged by a time corresponding to the period-increase rate.

Then, the data controller 152 rewrites the sensitivity setting register 159 to set the corrected image reading sensitivity (charge accumulating period).

(Step S32)

If the mean value of lightness data at an image reading sensitivity having a maximum dynamic range is determined in step S29 to be larger than the median value of the dynamic range, the main controller 153 determines that the lightness data distribution at this image reading sensitivity is proper. The data controller 152 rewrites the sensitivity setting register 159 without performing period-increase correction, and sets the image reading sensitivity (charge accumulating period) extracted in step S26.

The sensitivity adjustment apparatus and method of the photosensor system can determine whether to execute period-increase correction processing for an extracted image reading sensitivity in accordance with whether lightness data at an image reading sensitivity having a maximum dynamic range is improper under the influence of keratinization of a finger or the like (fluctuation factor or trend such as the individual difference of a subject or an external environment) in image reading sensitivity adjustment operation of setting an optimal image reading sensitivity (charge accumulating period) on the basis of the dynamic range of lightness data for each image reading sensitivity obtained by sensitivity adjustment reading operation executed prior to normal image reading operation. A proper image reading sensitivity can be set by executing correction processing only for an improper image reading sensitivity.

In the second embodiment, when whether to execute period-increase correction based on a predetermined period-increase rate is determined for an image reading sensitivity having a maximum dynamic range out of lightness data for respective image reading sensitivities acquired by sensitivity adjustment reading operation, the median value of the dynamic range is uniquely set for comparison with the mean value of lightness data at the image reading sensitivity. However, the present invention is not limited to this.

For example, the median value of the dynamic range may be used as a default value (reference value), and the mean compare value set in the mean compare value register 158 may be arbitrarily changed and set by input operation outside the photosensor (or controller 150).

Similar to the period-increase register 157 described in the first embodiment, the mean compare value register 158 is rewritten by operating the input/output interface device (not shown) of the external function section 200, inputting an arbitrary mean compare value as numerical data, and rewriting the mean compare value register 158. As an example to which the arrangement of arbitrarily rewriting the mean compare value is suitable applied, the photosensor system is applied to a fingerprint reading apparatus. In this arrangement, when fingerprint collation processing is executed in the external function section 200 by using as a reference the ridge portion (e.g., portions observed in white in FIGS. 7A and 8A) of the image pattern of a fingerprint, the mean compare value is set to a relatively large value so as to facilitate execution of the above-described period-increase correction processing.

As another example, if the humidity is low in an arrangement which allows grasping an external environment such as a temperature in advance by a sensor or the like, the mean compare value is set to a relatively large numerical value because the skin surface layer readily keratinizes. This facilitates execution of period-increase correction processing described above.

As still another example, the mean compare value is set to a relatively large numerical value for an individual exhibiting a low authentication probability of fingerprint collation processing in an arrangement which enables grasping the feature of an individual serving as a subject by an ID card or the like. This also facilitates execution of the above-mentioned period-increase correction processing.

Accordingly, a more optimal image reading sensitivity can be set to accurately read a subject image while the influence of an individual difference or external environment is suppressed.

Third Embodiment

The third embodiment of a photosensor system according to the present invention will be described with reference to the several views of the accompanying drawing.

Figure 11:
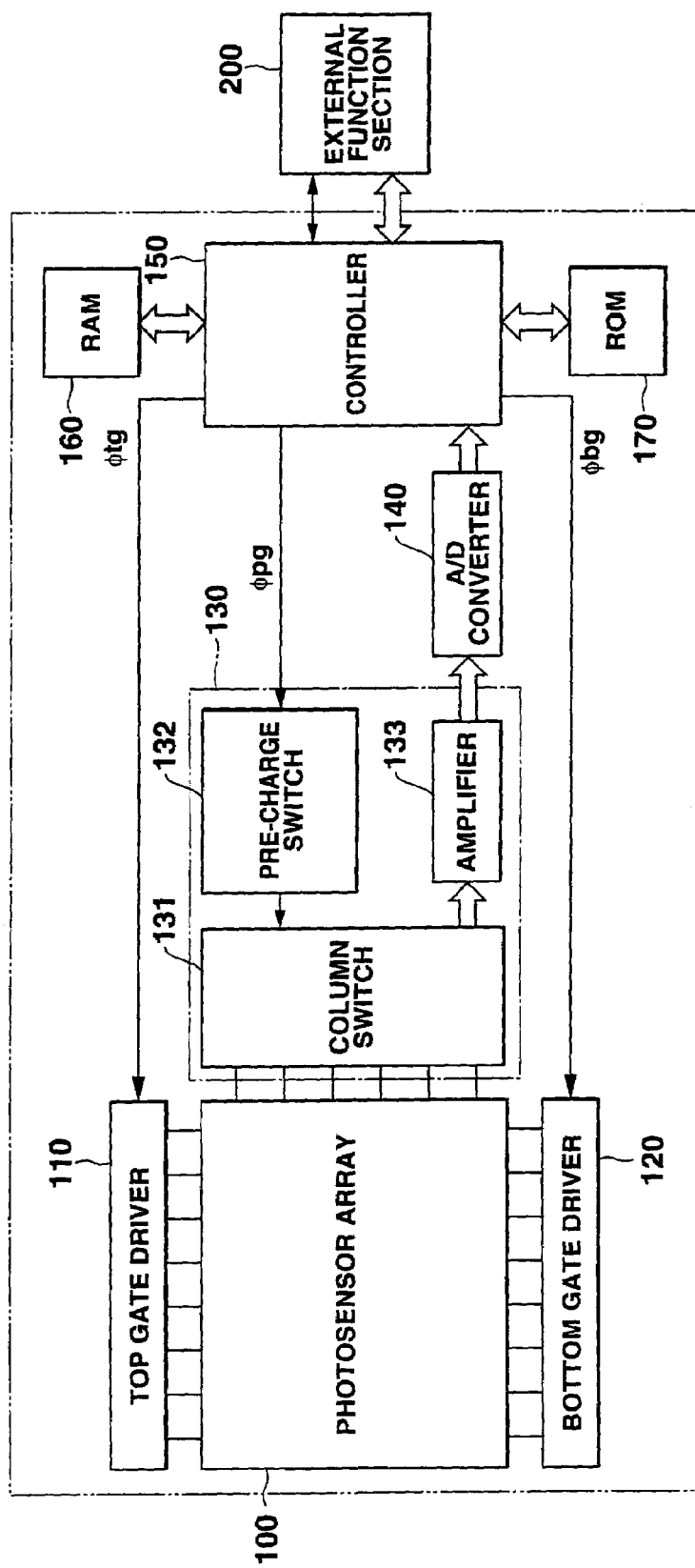
FIG. 11 is a block diagram showing an arrangement of a photosensor system according to a third embodiment of the present invention.

FIG. 11 is a block diagram showing the whole arrangement of the photosensor system according to the third embodiment. A double-gate photosensor shown in FIG. 26A is adopted as a photosensor, and the arrangement of the photosensor system shown in FIG. 27 will be referred to, as needed. The same reference numerals as in the photosensor system shown in FIG. 1 denote the same parts, and a description thereof will be simplified or omitted.

As shown in FIG. 11, similar to the photosensor system shown in FIG. 1, the photosensor system according to the third embodiment roughly comprises a photosensor array 100, a top gate driver 110, a bottom gate driver 120, an output circuit section 130 which is made up of a column switch 131, pre-charge switch 132, and amplifier 133, an A/D converter 140, a controller 150, and a RAM 160 for temporarily storing acquired image data (pixel data group), and processing data or the like relating to sensitivity setting processing. The photosensor system further comprises a ROM 170 which holds the control program of the controller 150 and various control data.

Similar to the first and second embodiments, the controller 150 has a function of performing sensitivity adjustment reading operation for a subject, and controlling extraction and setting of an image reading sensitivity capable of accurately reading a subject image on the basis of the read image data. In addition, as will be described below, the controller 150 has a function of removing specific pixel data from image data (pixel data group) of a subject image read for sensitivity adjustment in sensitivity adjustment reading operation in order to prevent or suppress the influence of abnormal pixel data caused by a foreign matter such as dust deposited on the sensing surface of the photosensor array or the influence of an element defect present on a photosensor array.

The detailed arrangement and operation of the controller applied to the photosensor system according to the third embodiment will be explained in more detail with reference to the several views of the accompanying drawing.

Figure 12:
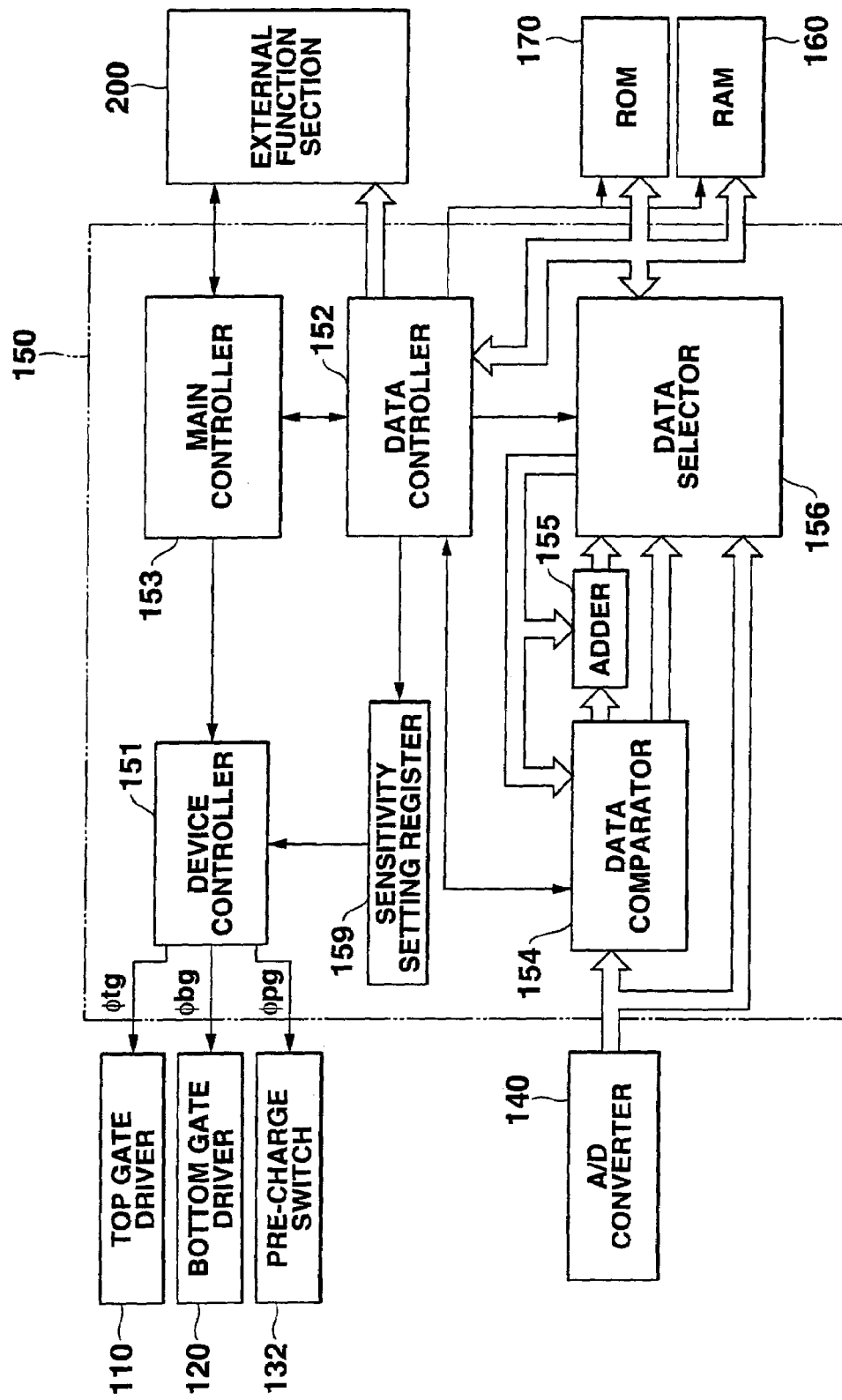
FIG. 12 is a block diagram showing an arrangement of a controller applied to the third embodiment.

FIG. 12 is a block diagram showing an arrangement of the controller applied to the photosensor system according to this embodiment.

As shown in FIG. 12, similar to the first embodiment shown in FIG. 2, the controller 150 in the third embodiment comprises a device controller 151 for controlling the operations of the top gate driver 110, bottom gate driver 120, and precharge switch 132, a data controller 152 for performing write/readout of data in/from the RAM 160 and ROM 170, and managing various data, and a main controller 153 which supervises the controllers 151 and 152 in accordance with a predetermined control program, interfaces with an external function section 200, and exchanges control signals. The controller 150 further comprises: a data comparator 154 for extracting maximum and minimum values by comparing the sizes of initial pixel data (to be also referred to as "original pixel data" hereinafter for descriptive convenience) contained in image data input as a digital signal from the photosensor array 100 via the A/D converter 140, or the sizes of pixel data (to be also referred to as "processed pixel data" hereinafter for descriptive convenience) obtained after specific pixel data undergoes removal processing by specific pixel data removal operation (to be described later), and for extracting a maximum dynamic range calculated by an adder 155; the adder 155 for calculating a dynamic range from the difference between the maximum and minimum values of processed pixel data extracted by the data comparator 154; a data selector 156 for receiving image data and processing data processed via the A/D converter 140, data comparator 154, and adder 155, and switching between write/readout of these data in/from the RAM 160 as needed, re-input of these data to the data comparator 154 and adder 155, and output of these data to the external function section 200 via the data controller 152; and a sensitivity setting register 159 for setting the timings of control signals φtg and φbg to be output from the device controller 151 to the top and bottom gate drivers 110 and 120 so as to optimize the image reading sensitivity of the photosensor array 100 on the basis of a control signal from the data controller 152.

The main controller 153 has the following function of removing specific pixel data. More specifically, the main controller 153 writes, in a predetermined storage area of the RAM 160 via the data selector 156, only a pixel data group except specific pixel data which is based on a predetermined condition and extracted by the data comparator 154, e.g., pixel data having a maximum or minimum value out of original pixel data. As a result, the main controller 153 can generate a pixel data (processed pixel data) group from which the pixel data having a maximum or minimum value is removed. Specific pixel data removal operation of the main controller 153 will be described in detail later.

A method of setting an optimal image reading sensitivity by the sensitivity setting register 159 in the photosensor array 100, top gate driver 110, and bottom gate driver 120 will be described in detail. This method also comprises the same steps as those in the first and second embodiments. That is, a dynamic range is calculated for each image reading sensitivity by comparing the sizes of lightness data contained in processed pixel data for each image reading sensitivity generated from image data (original pixel data) input from the photosensor array. An image reading sensitivity which yields a maximum dynamic range is set as an optimal value.

Processing operation by the controller having the above-mentioned arrangement will be explained with reference to the several views of the accompanying drawings.

Figure 13:
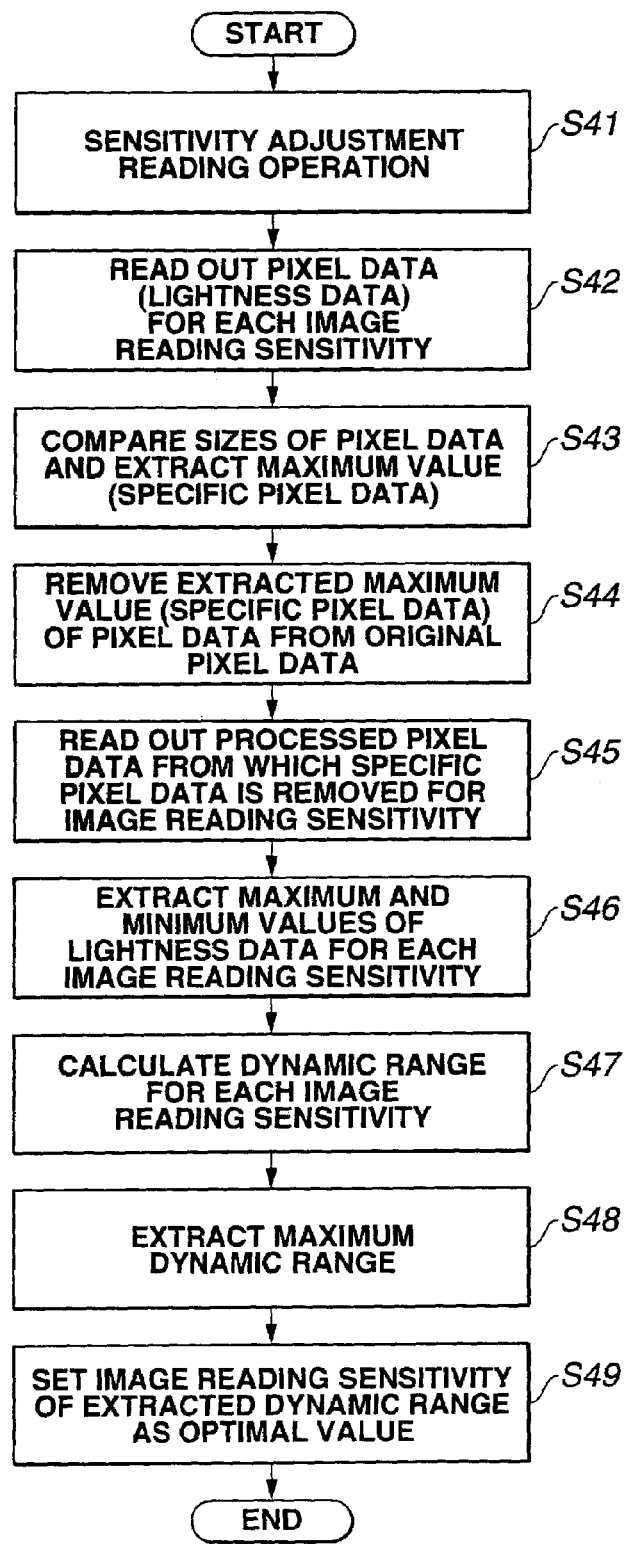
FIG. 13 is a flow chart showing an example of sensitivity adjustment/setting processing executed by the controller according to the third embodiment.

FIG. 13 is a flow chart showing an example of sensitivity adjustment/setting processing executed by the controller applied to the photosensor system according to the third embodiment. A description of the same processing steps as those in the first embodiment shown in FIG. 3 will be simplified or omitted.

A series of following processing steps are implemented by loading a control program stored in advance in the ROM 170 to the RAM 160 and executing the program by the controller 150.

(Step S41)

As shown in FIG. 13, the main controller 153 starts sensitivity adjustment reading operation at a timing prior to normal reading operation of a subject image. The main controller 153 sets an image reading sensitivity for sensitivity adjustment reading operation in the sensitivity setting register 159 via the data controller 152. The main controller 153 reads a sensitivity adjustment subject image placed on a sensing surface defined on one surface of the photosensor array 100. This sensitivity adjustment reading operation is performed while the charge accumulating period is changed stepwise every row of the photosensor array 100 so as to increase the image reading sensitivity for a larger row number, as shown in FIG. 4. Hence, image data read at different image reading sensitivities are acquired by one reading operation.

(Step S42)

Image data read by sensitivity adjustment reading operation is converted into a digital signal via the A/D converter 140, and the digital signal is temporarily stored in the RAM 160 via the data selector 156. Thereafter, the data controller 152 inputs the digital data as original pixel data (lightness data) of each image reading sensitivity to the data comparator 154 via the data selector 156.

(Step S43)

The data comparator 154 compares the sizes of lightness data of input original pixel data for each image reading sensitivity. The data comparator 154 extracts specific pixel data which satisfies a predetermined condition, i.e., pixel data having a maximum lightness data value or a plurality of pixel data in descending order of lightness data values.

(Step S44)

Pixel data having a maximum value extracted in step S43 or a predetermined number of pixel data containing the maximum value are removed from an original pixel data group for each image reading sensitivity. The remaining image data group is stored in a predetermined storage area of the RAM 160, generating a pixel data group (processed pixel data) obtained by removing the specific pixel data from the original pixel data group. A detailed example of specific pixel data removal operation will be described later.

(Steps S45 & S46)

The data controller 152 extracts the processed pixel data for each image reading sensitivity, and loads the data into the data comparator 154 via the data selector 156. The data comparator 154 compares the sizes of the processed pixel data for each image reading sensitivity, and extracts pixel data having maximum and minimum lightness data values.

(Step S47)

The adder 155 controlled by the data controller 152 calculates the difference between the maximum and minimum lightness data values of pixel data extracted for each image reading sensitivity, thereby obtaining a dynamic range for each image reading sensitivity. The result is temporarily stored in the RAM 160 via the data selector 156.

This dynamic range calculation processing is executed for respective image reading sensitivities.

(Step S48)

Dynamic ranges for respective image reading sensitivities stored in the RAM 160 are read out via the data selector 156, and loaded into the data comparator 154. The data comparator 154 compares the dynamic ranges for respective image reading sensitivities, and extracts a maximum dynamic range.

(Step S49)

The sensitivity setting register 159 is rewritten via the data controller 152 to set an image reading sensitivity corresponding to the extracted maximum dynamic range as an optimal image reading sensitivity.

Sensitivity adjustment reading operation (step S41) applied to the above-described processing operation of the controller will be explained in detail with reference to the several views of the accompanying drawing.

Figure 14A:
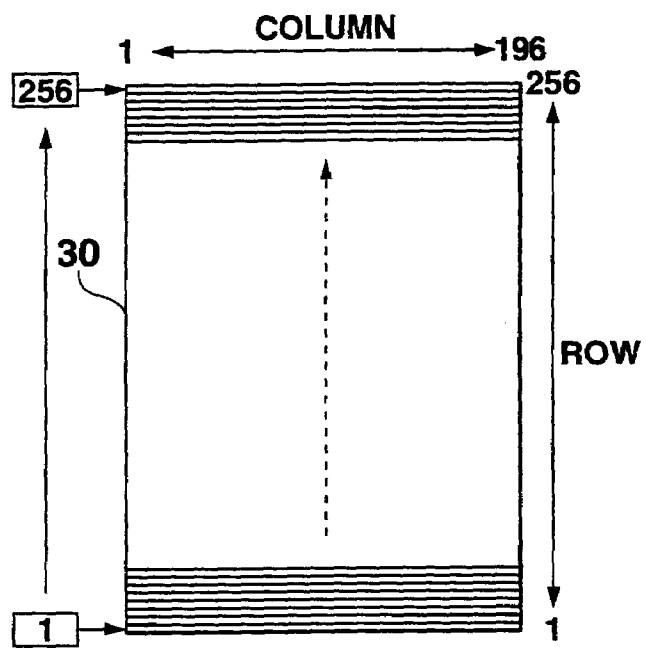
FIGS. 14A and 14B are conceptual views showing a target region and an example of reading operation in sensitivity adjustment reading operation according to the third embodiment.
Figure 14B:
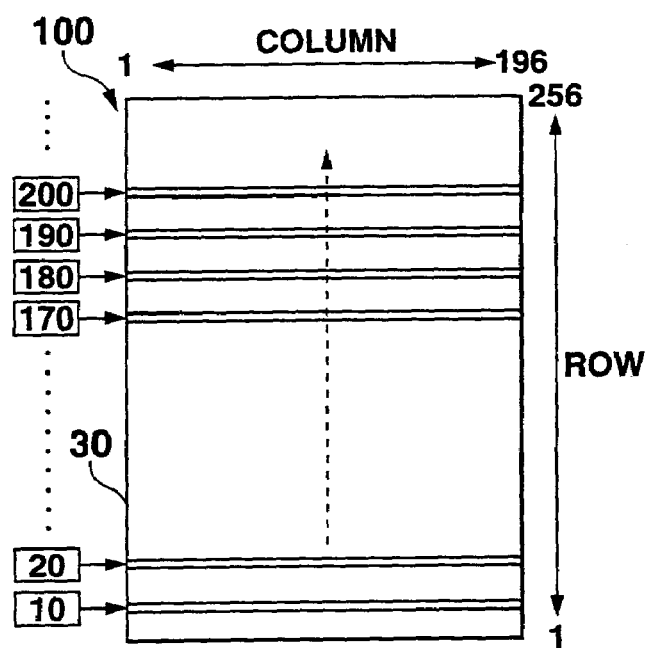

FIGS. 14A and 14B are conceptual views showing a target region and an example of reading operation in sensitivity adjustment reading operation according to the third embodiment. FIGS. 15A and 15B are conceptual views showing another target region and another example of reading operation in sensitivity adjustment reading operation according to the third embodiment.

Sensitivity adjustment reading operation applied to the third embodiment is executed as follows. On the basis of control signals and an image reading sensitivity which are output from the device controller 151 and set in the top gate driver 110, bottom gate driver 120, and pre-charge switch 132, a sensitivity adjustment image placed on the sensing surface is read within an effective reading region 30 formed from the entire sensing surface of the photosensor array 100, as shown in FIGS. 14A and 14B, or within a detection region 40 formed from a predetermined region restricted and set in advance within the effective reading region 30, as shown in FIGS. 15A and 15B.

Image reading sensitivities set in double-gate photosensors 10 which constitute the photosensor array 100 may be set to differ from each other, e.g., stepwise every row, every predetermined number of rows, or every reading region such as every effective reading region 30 or every detection region 40.

As a detailed driving method of the photosensor 10 in sensitivity adjustment reading operation, all the rows in the photosensor array 100 made up of 256×196 pixels may be sequentially read, as shown in FIG. 14A. Alternatively, every plurality of rows (in this case, every 10 rows) such as the 10th, 20th, ..., 180th, and 190th rows may be sequentially read, as shown in FIG. 14B.

For example, all the rows in the detection region 40 formed from a row range of 64th to 191st rows and a column range of 67th to 130th columns may be sequentially read, as shown in FIG. 15A. Alternatively, every plurality of rows (in this case, every 10 rows) such as 70th, 80th, ..., 180th, and 190th rows may be sequentially read, as shown in FIG. 15B.

In the third embodiment, a region to be read in normal image reading operation of a subject may be directly set as a region (effective reading region 30 or detection region 40) subjected to sensitivity adjustment reading operation. As the detection region 40, the number of pixels included in the region (row and column ranges) may be so set as to have at least a minimum number of pixel data necessary to satisfactorily execute processing operation in specific pixel data removal operation and optimal image reading sensitivity setting operation which are applied to this embodiment. A region subjected to sensitivity adjustment reading operation according to the third embodiment is not limited to the setting region (128 rows from 64th to 191st rows and columns from 67th to 130th columns) of the detection region 40. A region defined by narrower (smaller number of pixels) row and column ranges may be set. Setting of a minimum region which can be set as a detection region will be verified later.

Specific pixel data removal operation (steps S43 and S44) applied to processing operation of the controller will be exemplified.

Of specific pixel data removal operation applied to this embodiment, operation of extracting one or a plurality of pixel data in descending order of lightness data values can adopt the following method.

More specifically, in step S43 described above, the lightness data values of original pixel data loaded into the data comparator 154 are compared for each image reading sensitivity. The original pixel data are sorted in descending order of lightness data values and stored in the RAM 160 via the data selector 156.

In steps S44 to S46, when pixel data stored in the RAM 160 to calculate a dynamic range are to be loaded into the data comparator 154 again, a predetermined number of pixel data from the first to n-th (n is an arbitrary natural number) pixel data are uniquely designated and removed in descending order of lightness data values from an original pixel data group sorted in the above-described way every image reading sensitivity. The remaining pixel data group (corresponding to processed pixel data) is loaded into the data comparator 154. Of the loaded pixel data group, pixel data having the largest lightness data value, i.e., pixel data second largest to the designated/removed pixel data, and pixel data having the smallest lightness data value are extracted and read out via the data selector 156. The adder 155 calculates the difference between the maximum and minimum values of the pixel data, i.e., a dynamic range.

By this simple processing of comparing pixel data and sorting them by their sizes, pixel data having a maximum lightness data value (highest lightness) or a predetermined number of pixel data in descending order of lightness data values are uniquely removed from an original pixel data group. In addition, pixel data having maximum and minimum values are extracted from a processed pixel data group.

A case wherein different image reading sensitivities are set for respective rows will be explained.

In step S103, the sizes of pixel data of pixels adjacent to each other on the photosensor array out of an original pixel data group loaded into the data comparator 154 every row, i.e., every image reading sensitivity are so compared as to sequentially extract, e.g., pixel data from the first pixel of the target row in descending size order.

More specifically, as shown in (a) and (b) of FIG. 16, pixel data of the first pixel (first pixel data) and pixel data of the second pixel (second pixel data) are compared in the pixel data group (m pixel data) of one row to extract pixel data having a larger lightness data value (higher lightness). The extracted pixel data and pixel data of the third pixel (third pixel data) are compared to extract pixel data having a larger lightness data value. This processing is executed up to the m-th pixel data of the target row.

By comparing pixel data of adjacent pixels, only pixel data having a larger lightness data value is always extracted and subjected to the next comparison processing. This comparison/extraction processing is repetitively executed for the pixel data group of one row, extracting only pixel data having a maximum lightness data value (highest lightness).

Then, as shown in (c) and (d) of FIG. 16, pixel data having a smaller lightness data value (lower lightness) is extracted in comparison/extraction processing described above. Extracted pixel data are sequentially stored in a predetermined storage area of the RAM 160 via the data selector 156. After pixel data having a maximum lightness data value is extracted, the pixel data group is loaded into the data comparator 154 again. Similar to the above-described comparison/extraction processing, the first pixel data (pixel data having a lower lightness as a result of comparing the first and second pixel data) is compared with the second pixel data (pixel data having a lower lightness as a result of comparing the third pixel data with pixel data having a higher lightness out of the first and second pixel data), extracting pixel data having a larger lightness data value (higher lightness). The extracted pixel data is compared with the third pixel data, extracting pixel data having a larger lightness data value. This processing is executed up to the (m-1)th pixel data of the target row.

In this manner, processing of always extracting only pixel data having a larger lightness data value as a result of comparing pixel data in a remaining pixel data group from which pixel data having a maximum lightness data value (highest lightness) is removed is repetitively executed. Only pixel data having the second largest lightness data value is extracted for the target image reading sensitivity (row). This pixel data comparison/extraction processing is repetitively executed i times (i is an arbitrary natural number). A predetermined number of pixel data up to the i-th pixel data are extracted in descending order of lightness data values.

Setting of removing only one pixel data having a maximum lightness data value from an original pixel data group for each image reading sensitivity is effective for eliminating the influence of abnormal pixel data caused by the element defect of a photosensor which constitutes a photosensor array. The number of element defects occurred at actual product level in a photosensor system applicable to the third embodiment is at most one per row which constitutes a photosensor array. Since a plurality of element defects hardly occur in one row, the present invention can satisfactorily employ a simple method of removing only pixel data having a maximum lightness data value.

A method of removing a predetermined number of (plurality of) pixel data in descending order of lightness data values from an original pixel data group for each image reading sensitivity can be effectively applied to eliminating the influence of a relatively large foreign matter deposited on the sensing surface on the photosensor array or the influence of abnormal pixel data caused by an element defect generated over a plurality of pixels.

Each method applied to the above-mentioned specific pixel data removal operation has been described by exemplifying only a method of uniquely extracting and removing, from an original pixel data group, pixel data having a maximum lightness data value or a predetermined number of pixel data having large lightness data values containing a maximum value in the presence of an abnormal pixel serving as a bright spot (bright spot defect) owing to the element defect of a photosensor which constitutes a photosensor array, variations in element characteristics, or deposition of a foreign matter on the sensing surface. The present invention is not limited to this, and only pixel data having a minimum lightness data value or a predetermined number of pixel data having small lightness data values containing a minimum value may be uniquely removed.

Even if a dark spot defect is generated by a foreign matter which is deposited on the sensing surface and detected darker (blacker) than a surrounding image pattern, abnormal pixel data in the target pixel can be uniquely removed before the start of optimal image reading sensitivity extraction/setting operation. The image reading sensitivity can be prevented or suppressed from being set higher than an originally proper value. Hence, a high-quality subject image can be obtained in normal image reading operation.

When a minimum number of pixel data necessary to properly execute optimal image reading sensitivity extraction/setting operation can be ensured, a predetermined number of pixel data in descending order of lightness data values and a predetermined number of pixel data in ascending order of lightness data values may be removed, as described above. In this case, the influence of both bright and dark spot defects can be eliminated.

The number of specific pixel data removable by the above-described specific pixel data removal operation, and setting of a detection region in sensitivity adjustment reading operation will be examined.

As described above, in specific pixel data removal operation according to the third embodiment, a predetermined number of (plurality of) pixel data having maximum or minimum lightness data values are removed from a pixel data group (original pixel data group) for each image reading sensitivity. To shorten the reading operation time in sensitivity adjustment reading operation, a target region, i.e., detection region 40 may be set narrow, and therefore the number of pixels may be set small without setting any condition or restriction. In this case, however, a plurality of pixel data are uniquely removed by specific pixel data removal operation, decreasing the number of processed pixel data. The number of pixel data used for optimal image reading sensitivity extraction/setting operation may become insufficient, failing to normally execute the processing.

To prevent this, the region subjected to sensitivity adjustment reading operation must be set to have the number of pixel data enough to properly execute optimal image reading sensitivity extraction/setting operation even after a predetermined number of pixel data are removed in specific pixel data removal operation.

More specifically, according to the examination by the present inventors, the interval between the bright and dark streaks (bright and dark patterns) of the fingerprint of an adult is about 300 μm when the photosensor system according to the third embodiment is applied to a fingerprint reading apparatus. On the other hand, the interval between pixels (double-gate photosensors) can be manufactured as small as about 50 μm in a photosensor array applied to the photosensor system according to the third embodiment. From this, detecting one bright/dark streak of the fingerprint image requires about six pixels.

Extracting an optimal image reading sensitivity with high precision in the above-mentioned optimal image reading sensitivity extraction/setting operation requires image data of about eight bright/dark streaks (about 48 pixels). When conditions are so set as to remove about 10 pixel data in order to eliminate the influence of abnormal pixel data caused by an element defect or deposition of a foreign matter on the sensing surface by the above-described specific pixel data removal operation, at least a region of about 60 pixels, i.e., a region corresponding to about 10 bright/dark streaks (corresponding to a width of about 3 mm) is set as a region subjected to sensitivity adjustment reading operation. Even if data of 10 pixels are removed as pixel data having large lightness data values, pixel data of the number of pixels (about 50 pixels) enough to ensure the extraction precision of an optimal image reading sensitivity can be left.

In this fashion, the number of pixels (or row and column ranges) contained in the detection region in the above sensitivity adjustment reading operation is set using, as parameters, a minimum number of pixels necessary to ensure a sufficient extraction precision of an optimal image reading sensitivity on the basis of an image pattern serving as a subject in optimal image reading sensitivity extraction/setting operation, and the number of specific pixel data to be removed based on the frequency of element defects generated in the photosensor array or the size of a foreign matter deposited on the sensing surface.

Note that this examination has exhibited merely an example when the photosensor system according to the third embodiment is applied to a fingerprint reading apparatus. The present invention is not limited to this, and the detection region is appropriately set in accordance with the image pattern of a subject, the manufacturing precision of the photosensor, the use environment of the photosensor system, or the like.

The effectiveness in an application of the photosensor system according to the present invention to a fingerprint reading apparatus will be explained by showing some experimental data in comparison with a conventional method. Optimal image reading sensitivity extraction/setting operation (steps S46 to S49) will also be described by referring to sensitivity setting operation of the photosensor system according to the above-described embodiment.

Figure 17A:
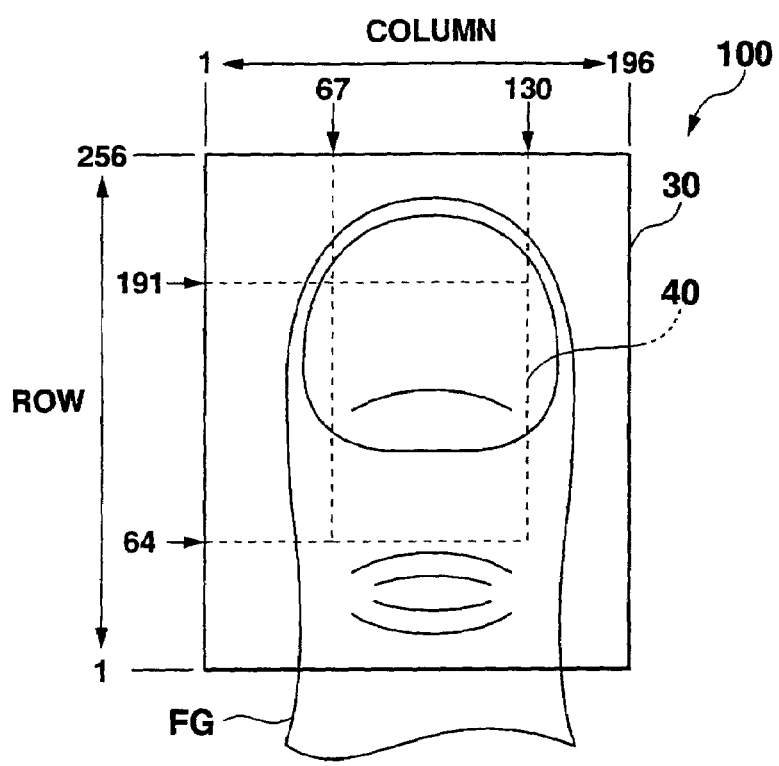
FIGS. 17A and 17B are views showing a predetermined detection region of a photosensor array in the third embodiment, and an example of a fingerprint image read within the detection region by sensitivity adjustment reading operation when an abnormal pixel exists.
Figure 17B:
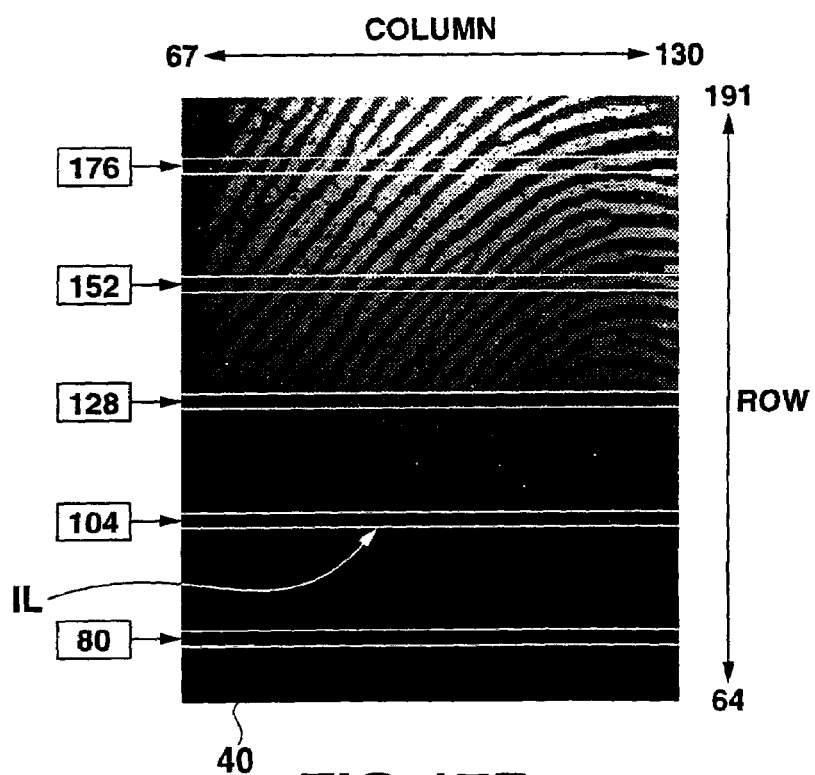
Figure 19A:
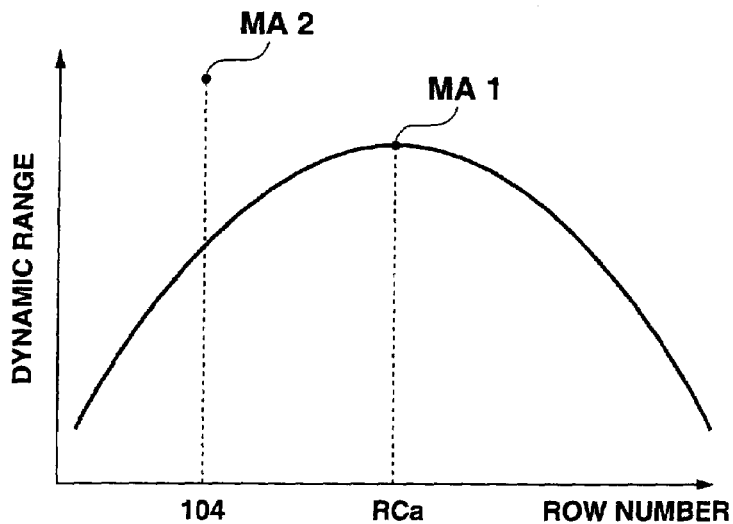
FIGS. 19A and 19B are a graph and table showing an example of the relationship between the dynamic range of lightness data for respective rows of fingerprint image data obtained by sensitivity adjustment reading operation when an abnormal pixel exists, and a row number vs. image reading sensitivity correspondence table.
Figure 19B:

FIGS. 17A and 17B show an example of the image pattern of a fingerprint when a subject image (sensitivity adjustment image) is read by performing sensitivity adjustment reading operation in a predetermined detection region of the photosensor array including an abnormal pixel caused by an element defect or the like in the photosensor system according to the third embodiment. FIGS. 18A to 18E are graphs showing changes in pixel data (lightness data) for respective rows of a fingerprint image obtained by sensitivity adjustment reading operation. FIGS. 19A and 19B are a graph showing changes in dynamic range based on pixel data (lightness data) obtained from the fingerprint image by sensitivity adjustment reading operation, and a correspondence table between the row number, the dynamic range, and the image reading sensitivity (charge accumulating period).

Figure 20A:
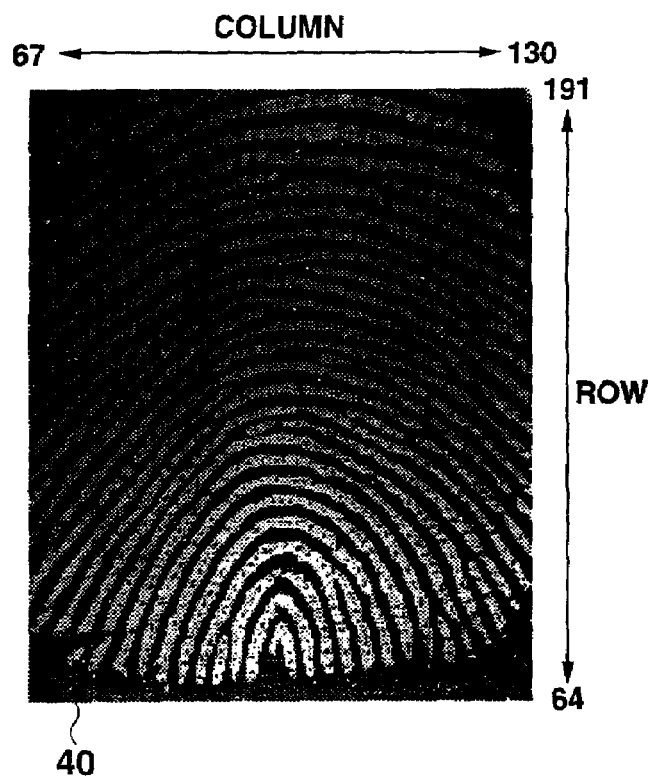
FIGS. 20A and 20B are views showing examples of the image pattern of a fingerprint when a sensitivity setting method according to the third embodiment is not applied and is applied in setting an image reading sensitivity using a photosensor array including an abnormal pixel.
Figure 20B:
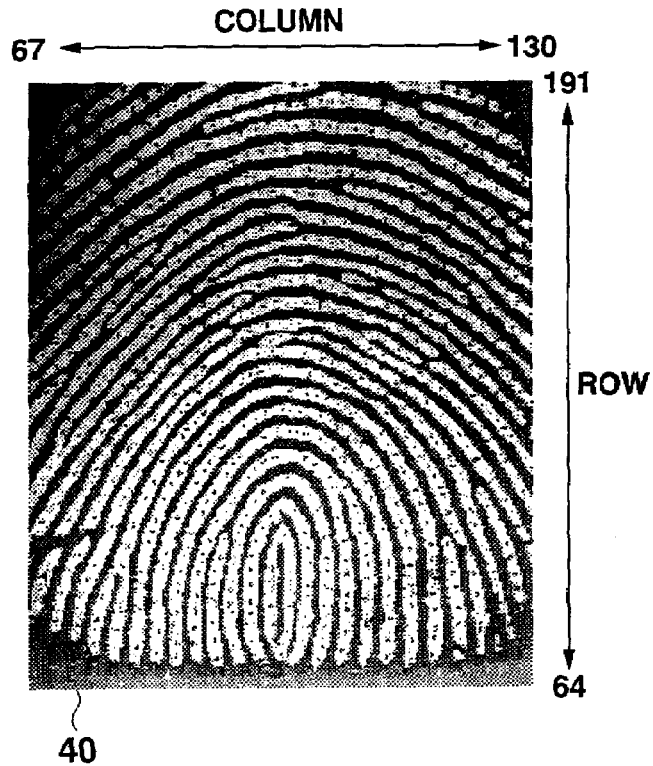
Figure 22A:
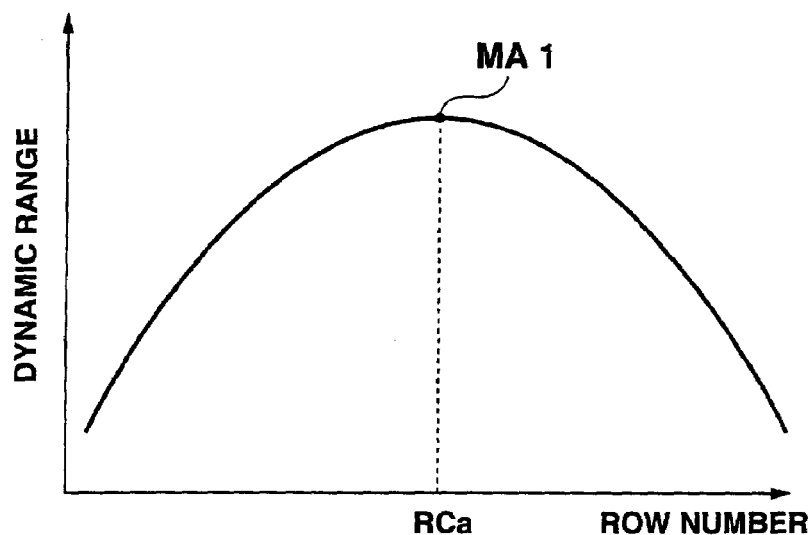
FIGS. 22A and 22B are a graph and table showing an example of the relationship between the dynamic range of lightness data for respective rows obtained by performing specific pixel data removal operation in the third embodiment for fingerprint image data which is obtained by sensitivity adjustment reading operation when an abnormal pixel exists, and a row number vs. image reading sensitivity correspondence table.
Figure 22B:

FIGS. 20A and 20B show examples of the image pattern of a fingerprint when a fingerprint image is read by setting an image reading sensitivity using the photosensor array including an abnormal pixel without applying the sensitivity setting method according to the third embodiment, and when the fingerprint image is read by setting an image reading sensitivity using the sensitivity setting method according to the third embodiment. FIGS. 21A to 21E are graphs showing changes in pixel data (lightness data) for respective rows of fingerprint image data obtained by specific pixel data removal operation according to this embodiment. FIGS. 22A and 22B are a graph showing changes in dynamic range based on pixel data (lightness data) obtained by specific pixel data removal operation according to the third embodiment, and a correspondence table between the row number, the dynamic range, and the image reading sensitivity (charge accumulating period).

As shown in FIG. 17A, the image pattern (fingerprint) of a finger FG serving as a subject in normal image reading operation is used as a sensitivity adjustment image. Different charge accumulating periods are set for photosensors on respective rows of the detection region 40 which is defined by a row range (128 rows) of 64th to 191st rows and a column range (64 columns) of 67th to 130th columns, and is set in advance within the effective reading region 30 of the photosensor array 100 made up of at least 256×196 pixels (photosensors). Then, sensitivity adjustment reading operation of reading the image pattern of the finger FG is executed to obtain a fingerprint image in which the image reading sensitivity changes stepwise every row in image reading operation of one frame, as shown in FIG. 17B. In this case, assume that an element defect (not shown) exists in the photosensor array 100 shown in FIG. 17A, and that a bright point defect IL which corresponds to the element defect and represents an extremely high lightness data value is generated in the fingerprint image within the detection region 40, as shown in FIG. 17B.

In this fingerprint image, the lightness data value is expressed by 256 gray levels. FIGS. 18A to 18E show the change trends of lightness data values in respective pixels in the 80th, 104th, 128th, 152nd, and 176th rows for descriptive convenience. For example, as shown in FIG. 18B illustrating changes in lightness data value in the 104th row, pixel data having an extremely high lightness data value is observed at a column number Rp in the 104th row corresponding to a position where the bright point defect IL shown in FIG. 17B occurs.

In the conventional sensitivity setting method described above, maximum and minimum lightness data values are extracted every row regardless of the presence/absence of an abnormal pixel (bright point defect IL) as shown in FIGS. 17B and 18B. The dynamic range is calculated from the difference between the maximum and minimum values. The lightness data value of the abnormal pixel saturates to represent the maximum value owing to the bright point defect IL present in the 104th row. As shown in FIGS. 19A and 19B, an apparent maximum value MA2 appears in the 104th row different from a column number RCa at which the dynamic range exhibits an original maximum value MA1. An image reading sensitivity (i.e., charge accumulating period $T_{104}$ of the photosensor) set for the 104th row representing the maximum value MA2 is determined to be an optimal image reading sensitivity. When the image reading sensitivity for the 104th row is set lower than an optimal image reading sensitivity, as shown in FIG. 17B, normal image reading operation at the erroneously set image reading sensitivity results in a dark, low-quality subject image, as shown in FIG. 20A. Fingerprint collation processing of comparing the read fingerprint image with a pre-registered fingerprint image and authenticating the fingerprint fails, and the collation precision decreases.

To the contrary, in the photosensor system and sensitivity setting method according to the present invention, if the bright point defect IL occurs in a fingerprint image due to an element defect present in the photosensor array, as shown in FIG. 17B, the above-described specific pixel data removal operation uniquely removes one or a plurality of (one pixel data in FIGS. 21A to 21E; the position of removed pixel data is indicated by an arrow in each row) pixel data from a pixel data group for each image reading sensitivity (each row), as shown in FIGS. 21A to 21E. Hence, at least pixel data at a column number Rp where the lightness data value is observed extremely high is necessarily removed, as shown in FIG. 21B.

Specific pixel data removal operation according to the present invention removes pixel data having a maximum lightness data value even in a row free from any abnormal pixel (bright point defect IL), as shown in FIGS. 21A, 21C to 21E. Even in this case, the change trend of the dynamic range in each row does not greatly change, as shown in FIG. 22A. The row number RCa at which the dynamic range exhibits the original maximum value MA1 can be accurately specified. An image reading sensitivity (charge accumulating period $T_{176}$) set for a corresponding row (e.g., 176th row) can be extracted and set as an optimal image reading sensitivity, as shown in FIG. 21B.

If normal image reading operation is executed at this optimal image reading sensitivity, a high-quality subject image can be obtained with a good bright/dark contrast of the image pattern as a whole, as shown in FIG. 20B. Errors in fingerprint collation processing can be prevented or suppressed. This means that an appropriate image reading sensitivity can be set even in the presence of a given number of element defects in the photosensor array or deposition of dirt on the sensing surface. In other words, the present invention can provide an effective technique capable of increasing the yield of a device such as a photosensor system or sensor array and simplifying maintenance or the like.

Similar to the dynamic range shown in FIG. 22A, the change trend of the dynamic range in each row subjected to optimal reading sensitivity extraction operation does not greatly change even when a plurality of pixel data are removed in descending order of lightness data values in specific pixel data removal operation. Similar to the above-mentioned example, the row number RCa at which the dynamic range exhibits a maximum value can be accurately specified, and an optimal image reading sensitivity can be set.

A photosensor array drive control method in each of the above embodiments will be described with reference to the several views of the accompanying drawing.

FIGS. 23A to 23J are timing charts showing an example of the drive control method applicable to image reading operation of the photosensor system. The drive control method will be explained by referring to the arrangement of the photosensor system shown in FIG. 27, as needed.

As shown in FIGS. 23A to 23J, reset pulses φT1, φT2, . . . , φTk, φTk+1, . . . (k is a positive integer; k=1, 2, . . . , n-1) are sequentially applied from a top gate driver 110 via top gate lines 101. A reset period $T_{rst}$ starts, and double-gate photosensors 10 in respective rows are initialized.

Then, the reset pulses φT1, φT2, . . . , φTk, φTk+1, . . . sequentially fall, the reset period $T_{rst}$ ends, and a charge accumulating period Ta starts. Charges (holes) are generated in accordance with the amount of light incident on the double-gate photosensors 10 in respective rows, and accumulated in the channel regions. As shown in FIG. 23I, a pre-charge signal φpg is applied to a drain driver 130 to start a pre-charge period $T_{prch}$ in parallel to the charge accumulating period Ta. A pre-charge voltage Vpg is applied to drain lines 103 to perform pre-charge operation of causing the drain electrodes of the double-gate photosensor 10 in respective rows to hold predetermined voltages.

Readout pulses φB1, φB2, . . . , φBk, φBk+1, . . . are sequentially applied from a bottom gate driver 120 to double-gate photosensors 10 where the charge accumulating period Ta and pre-charge period $T_{prch}$ end via bottom gate lines 102 for respective rows at timings which do not temporarily overlap the application timings of signals for reset operation, pre-charge operation, and readout operation in other rows. Then, a readout period $T_{read}$ starts, and changes in drain voltages VD1, VD2, VD3, . . . , VDm corresponding to charges accumulated in the double-gate photosensors 10 in respective rows are simultaneously detected by the drain driver 130 via the drain lines 103 and read out as an output voltage Vout of serial or parallel data.

In the drive control method, the application timing interval (Tdly) between the reset pulses φT1, φT2, φT3, . . . , the readout pulses φB1, φB2, φB3, . . . , and the pre-charge signal φpg for respective rows is set equal to or longer than a total time of the reset period $T_{rst}$ of the reset pulses, the readout period $T_{read}$ of the readout pulses, and the pre-charge period $T_{prch}$ of the pre-charge signal:

$$Tdly = Trst + Tprch + Tread \quad (1)$$

This setting inhibits executing reset operation, pre-charge operation, and readout operation at temporarily overlapping timings. Further, part of processing cycles in respective rows can be made to overlap each other. Reading operation can start before reset operation in all the rows ends. While two-dimensional image reading operation is properly executed, the processing time of reading operation can be greatly shortened.

FIGS. 24A to 24J are timing charts showing the first example of an image reading sensitivity (charge accumulating period) setting method which can be preferably applied to sensitivity adjustment reading operation according to the present invention.

As shown in FIGS. 24A to 24J, the reset pulses φT1, φT2, . . . , φTn are simultaneously applied to the top gate lines 101 each of which connects top gate terminals TG of the double-gate photosensors 10 in the row direction. The reset period $T_{rst}$ starts simultaneously on the top gate lines 101, and the double-gate photosensors 10 in respective rows are initialized.

Then, the reset pulses φT1, φT2, . . . , φTn simultaneously fall, the reset period $T_{rst}$ ends, and the charge accumulating periods $T_1, T_2, \ldots, T_{n-1}$, and $T_n$ of the double-gate photosensors 10 in all the rows simultaneously start. Charges (holes) are generated in accordance with the amount of light incident from the top gate electrode side on the double-gate photosensors 10 in respective rows, and accumulated in the channel regions.

The pre-charge signal φpg and the readout pulses φB1, φB2, . . . , φBn are applied such that charge accumulating periods $T_1, T_2, \ldots, T_{n-1}$, and $T_n$ set for respective rows change stepwise every row by a predetermined delay time $T_{delay}$, as shown in FIGS. 24A to 24J.

Accordingly, image data read at different image reading sensitivities for respective rows which constitute a subject image, i.e., different image reading sensitivities corresponding to the number of rows can be acquired by reading a subject image (one frame) once in sensitivity adjustment reading operation.

FIGS. 25A to 25H are timing charts showing the second example of the image reading sensitivity (charge accumulating period) setting method which can be preferably applied to sensitivity adjustment reading operation according to the present invention.

In the image reading sensitivity setting method according to this example, as shown in FIGS. 25A to 25H, the reset pulses φT1, φT2, . . . , φTn are sequentially applied at the time interval of a predetermined delay time $T_{delay}$ to the top gate lines 101 each of which connects the top gate terminals TG of the double-gate photosensors 10 in the row direction. The reset period $T_{rst}$ starts, and the double-gate photosensors 10 in respective rows are initialized.

Then, the reset pulses φT1, φT2, ..., φTn fall, the reset period $T_{rst}$ ends, and charge accumulating periods $TA_1$, $TA_2$, ..., $TA_{n-1}$, and $TA_n$ sequentially start. Charges (holes) are generated in accordance with the amount of light incident from the top gate electrode side on the double-gate photosensors 10 in respective rows, and accumulated in the channel regions.

The pre-charge signal φpg and the readout pulses φBn, φBn-1, ..., φB2, and φB1 are applied such that the charge accumulating periods $TA_1$, $TA_2$, ..., $TA_{n-1}$, and $TA_n$ set for respective rows change stepwise every row by the predetermined delay time $T_{delay}$ after the final reset pulse φTn falls, as shown in FIGS. 25A to 25J.

By this sensitivity adjustment reading operation, the charge accumulating periods $TA_1$, $TA_2$, ..., $TA_{n-1}$, and $TA_n$ set for respective rows increase at a time interval twice the predetermined delay time $T_{delay}$. Image data read at image reading sensitivities set with a sensitivity adjustment width of several rows or more can be acquired by reading operation of one frame.

Note that the image reading sensitivity (charge accumulating period) setting method applied to sensitivity adjustment reading operation according to the present invention is not limited to the above-mentioned examples. For example, image data of a subject image may be acquired at different image reading sensitivities by serially repeating a processing cycle: reset operation→charge accumulating operation→pre-charge operation→reading operation while sequentially changing the image reading sensitivity. Alternatively, still another method can be adopted.

The photosensor which constitutes a photosensor array is a double-gate photosensor in the above-described embodiments and examples, but the present invention is not limited to this. As far as the photosensor which constitutes a photosensor array performs image reading sensitivity adjustment operation, the arrangement of the sensitivity adjustment apparatus of the photosensor system and the sensitivity adjustment method according to the present invention can be preferably applied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photosensor system comprising:
a photosensor array comprising a plurality of photosensors arrayed two-dimensionally;
an image reading section which reads a subject image at a predetermined image reading sensitivity, corresponding to a charge accumulating period, by using the photosensor array;
sensitivity adjustment image reading means for reading a sensitivity adjustment subject image using a plurality of image reading sensitivities;
optimal image reading sensitivity deriving means for deriving an image reading sensitivity optimal for reading the subject image, based on a pixel data group relating to an image pattern of the subject image read by the sensitivity adjustment image reading means;
wherein the optimal image reading sensitivity deriving means comprises specific data removal means for removing from the pixel data group specific pixel data including at least pixel data having a maximum or minimum value in the pixel data group, without judging whether or not the specific pixel data is defective, so as to correct the pixel data group, wherein the optimal image reading sensitivity is derived based on the corrected pixel data group;
image reading sensitivity setting means for setting the optimal image reading sensitivity as the image reading sensitivity in the image reading section; and
reading control means for controlling execution of reading of the subject image, by using the image reading sensitivity set by the image reading sensitivity setting means.

2. A system according to claim 1, wherein:
the optimal image reading sensitivity deriving means further comprises image reading sensitivity correction means for correcting only one time a value of the image reading sensitivity optimal for reading the subject image derived based on the pixel data group so that the value increases by a value corresponding to a predetermined period-increase rate so as to correct the image reading sensitivity, wherein the corrected image reading sensitivity is set as the optimal image reading sensitivity; and
the image reading sensitivity correction means comprises means for correcting the charge accumulating period corresponding to the image reading sensitivity optimal for reading the subject image to increase the charge accumulating period by a period corresponding to the predetermined period-increase rate.

3. A system according to claim 1, wherein:
the optimal image reading sensitivity deriving means further comprises image reading sensitivity correction means for correcting only one time a value of the image reading sensitivity optimal for reading the subject image derived based on the pixel data group so that the value increases by a value corresponding to a predetermined period-increase rate so as to correct the image reading sensitivity, wherein the corrected image reading sensitivity is set as the optimal image reading sensitivity;
the optimal image reading sensitivity deriving means comprises standard image reading sensitivity extraction means for extracting a standard image reading sensitivity as the image reading sensitivity optimal for reading the subject image, based on a pixel data group for each of the image reading sensitivities with which the sensitivity adjustment subject image is read by the sensitivity adjustment image reading means; and
the image reading sensitivity correction means corrects the value of the standard image reading sensitivity so that the value is increased by the predetermined period-increase rate.

4. A system according to claim 3, wherein the standard image reading sensitivity extraction means comprises:
data extraction means for extracting maximum and minimum values from the pixel data group for each said image reading sensitivity;
data range calculation means for calculating a data range of the pixel data group for each said image reading sensitivity based on the maximum and minimum values of the pixel data group, and
extraction means for extracting the standard image reading sensitivity based on the data range for each said image reading sensitivity.

5. A system according to claim 4, wherein the extraction means extracts as the standard image reading sensitivity an image reading sensitivity having a maximum data range out of data ranges for the respective image reading sensitivities.

6. A system according to claim 1, wherein the optimal image reading sensitivity deriving means further comprises image reading sensitivity correction means for correcting only one time a value of the image reading sensitivity optimal for reading the subject image derived based on the pixel data group so that the value increases by a value corresponding to a predetermined period-increase rate so as to correct the image reading sensitivity, wherein the corrected image reading sensitivity is set as the optimal image reading sensitivity, and wherein the period-increase rate is arbitrarily set from outside the photosensor system.

7. A system according to claim 3, wherein the optimal image reading sensitivity deriving means comprises means for comparing a mean value of the pixel data group at the standard image reading sensitivity with a predetermined reference value, and judges whether correction based on the predetermined period-increase rate should be executed.

8. A system according to claim 7, wherein the reference value corresponds to a median value of a data range of the pixel data group at the standard image reading sensitivity.

9. A system according to claim 7, wherein the reference value is arbitrarily set from outside the photosensor system.

10. A system according to claim 1, wherein the optimal image reading sensitivity deriving means comprises:
  image reading sensitivity extraction means for extracting an image reading sensitivity suitable for a normal reading operation of the subject image based on the pixel data group from which the specific pixel data has been removed by the specific data removal means, and
  setting means for setting as the optimal image reading sensitivity the image reading sensitivity extracted by the image reading sensitivity extraction means.

11. A system according to claim 10, wherein the image reading sensitivity extraction means comprises:
  data extraction means for extracting maximum and minimum values from the pixel data group from which the specific data has been removed for each said image reading sensitivity,
  data range calculation means for calculating a data range of the pixel data group for each said image reading sensitivity based on the maximum and minimum values of the pixel data group extracted by the data extraction means, and
  extraction means for extracting an image reading sensitivity having a maximum data range out of data ranges of pixel data groups for the respective image reading sensitivities.

12. A system according to claim 1, wherein the specific data removal means removes a plurality of pixel data sequentially from a maximum value from the pixel data group obtained by the sensitivity adjustment image reading means for each said image reading sensitivity.

13. A system according to claim 1, wherein the specific data removal means removes a plurality of pixel data sequentially from a minimum value from the pixel data group obtained by the sensitivity adjustment image reading means for each said image reading sensitivity.

14. A system according to claim 1, wherein the sensitivity adjustment image reading means reads the sensitivity adjustment subject image only in a detection region set in advance within an effective reading region of the photosensor array.

15. A system according to claim 14, wherein the detection region is set to be a region where the pixel data group from which the specific pixel data has been removed by the specific data removal means contains a minimum number of pixel data necessary to normally execute at least a reading sensitivity setting operation of the image reading sensitivity setting means.

16. A system according to claim 1, wherein a reading operation of the subject image in the sensitivity adjustment image reading means is executed by setting the image reading sensitivities to differ stepwise for a predetermined number of rows in the photosensor array.

17. A system according to claim 1, wherein the sensitivity adjustment image reading means reads the sensitivity adjustment subject image within an entire effective reading region of the photosensor array.

18. A system according to claim 1, wherein the pixel data group includes lightness data corresponding to the image pattern of the subject image.

19. A system according to claim 1, wherein each photosensor comprises source and drain electrodes which are formed on respective sides of a channel layer formed from a semiconductor layer, and first and second gate electrodes which are formed above and below the channel region via insulating films,
  wherein one of the first and second gate electrodes is set as a light irradiation side, and charges corresponding to an amount of light incident onto the light irradiation side are generated and accumulated in the channel region.

20. A system according to claim 1, wherein the optimal image reading sensitivity deriving means further comprises image reading sensitivity correction means for correcting only one time a value of the image reading sensitivity optimal for reading the subject image derived based on the pixel data group so that the value increases by a value corresponding to a predetermined period-increase rate having a predetermined constant value so as to correct the image reading sensitivity, wherein the corrected image reading sensitivity is set as the optimal image reading sensitivity.

21. A drive control method for a photosensor system which includes a photosensor array comprising a plurality of two-dimensionally arrayed photosensors, and which reads a subject image by using the photosensor array, said method comprising:
  reading a sensitivity adjustment subject image using a plurality of image reading sensitivities corresponding to respective charge accumulating periods;
  deriving an image reading sensitivity suitable for reading the subject image based on a pixel data group relating to an image pattern of the subject image read from the sensitivity adjustment subject image;
  wherein deriving the image reading sensitivity comprises removing from the pixel data group specific pixel data including at least pixel data having a maximum or minimum value in the pixel data group, without judging whether or not the specific pixel data is defective, so as to correct the pixel data group; and
  setting the derived image reading sensitivity as a reading sensitivity for reading the subject image thereby executing reading of the subject image, by using the image reading sensitivity.

22. A method according to claim 21, wherein:
  deriving the image reading sensitivity further comprises correcting only one time a value of the image reading sensitivity suitable for reading the subject image derived based on the pixel data group so that the value increases by a value corresponding to a predetermined period-increase rate so as to correct the image reading sensitivity; and
  correcting the value of the image reading sensitivity suitable for reading the subject image comprises correcting the charge accumulating period corresponding to the image reading sensitivity so as to increase the charge accumulating period by a period corresponding to the predetermined period-increase rate.

23. A method according to claim 21, wherein:
deriving the image reading sensitivity further comprises correcting only one time a value of the image reading sensitivity suitable for reading the subject image derived based on the pixel data group so that the value increases by a value corresponding to a predetermined period-increase rate so as to correct the image reading sensitivity;
deriving the image reading sensitivity suitable for reading the subject image comprises extracting a standard image reading sensitivity as the image reading sensitivity suitable for reading the subject image, based on a pixel data group for each of the image reading sensitivities used in reading the sensitivity adjustment subject image; and
correcting the value of the image reading sensitivity suitable for reading the subject image comprises correcting the value of the standard image reading sensitivity so that the value is increased by the predetermined period-increase rate.

24. A method according to claim 23, wherein extracting the standard image reading sensitivity comprises:
extracting maximum and minimum values from the pixel data group for each said image reading sensitivity;
calculating a data range of the pixel data group for each said image reading sensitivity based on the maximum and minimum values of the pixel data group, and
extracting the standard image reading sensitivity based on the data range for each said image reading sensitivity.

25. A method according to claim 24, wherein extracting the standard image reading sensitivity based on the data ranges comprises comparing data ranges for the respective image reading sensitivities, and extracting as the standard image reading sensitivity an image reading sensitivity having a maximum data range.

26. A method according to claim 21, wherein deriving the image reading sensitivity further comprises correcting only one time a value of the image reading sensitivity suitable for reading the subject image derived based on the pixel data group so that the value increases by a value corresponding to a predetermined period-increase rate so as to correct the image reading sensitivity, and the period-increase rate is arbitrarily set from outside the photosensor system.

27. A method according to claim 23, wherein deriving the image reading sensitivity suitable for reading the subject image comprises comparing a mean value of the pixel data group at the standard image reading sensitivity with a predetermined reference value, and judging whether correction based on the predetermined period-increase rate should be executed.

28. A method according to claim 27, wherein the reference value corresponds to a median value of a data range of the pixel data at the standard image reading sensitivity.

29. A method according to claim 27, wherein the reference value is arbitrarily set from outside the photosensor system.

30. A method according to claim 21, wherein deriving the image reading sensitivity suitable for reading the subject image comprises extracting an image reading sensitivity suitable for a normal reading operation of the subject image based on the pixel data group from which the specific pixel data has been removed.

31. A method according to claim 30, wherein extracting the image reading sensitivity suitable for the normal reading operation of the subject image comprises:

extracting maximum and minimum values from the pixel data group from which the specific data has been removed for each said image reading sensitivity,
calculating a data range of the pixel data group for each said image reading sensitivity based on the maximum and minimum values of the pixel data group extracted for each said image reading sensitivity, and
extracting an image reading sensitivity having a maximum data range out of data ranges of pixel data groups for the respective image reading sensitivities.

32. A method according to claim 21, wherein removing the specific pixel data comprises:
comparing sizes of all pixel data contained in the pixel data group for each said image reading sensitivity, and sorting the pixel data; and
removing a predetermined number of pixel data from at least one end of a string of the sorted pixel data.

33. A method according to claim 21, wherein removing the specific pixel data comprises repeating a predetermined number of times: comparing sizes of all pixel data contained in the pixel data group for each said image reading sensitivity, and extracting and removing pixel data having a maximum or minimum value.

34. A method according to claim 21, wherein reading the sensitivity adjustment subject image comprises setting the image reading sensitivities to differ stepwise for a predetermined number of rows in the photosensor array.

35. A method according to claim 21, wherein the pixel data group includes lightness data corresponding to the image pattern of the subject image.

36. A method according to claim 21, wherein each photosensor comprises source and drain electrodes which are formed on respective sides of a channel layer formed from a semiconductor layer, and first and second gate electrodes which are formed at least above and below the channel region via insulating films,
wherein one of the first and second gate electrodes is set as a light irradiation side, and charges corresponding to an amount of light entering from the light irradiation side are generated and accumulated in the channel region.

37. A method according to claim 21, wherein deriving the image reading sensitivity further comprises correcting only one time a value of the image reading sensitivity suitable for reading the subject image derived based on the pixel data group so that the value increases by a value corresponding to a predetermined period-increase rate having a predetermined constant value so as to correct the image reading sensitivity.

38. A photosensor system comprising:
a photosensor array comprising a plurality of photosensors arrayed two-dimensionally;
an image reading section which reads a subject image at a predetermined image reading sensitivity, corresponding to a charge accumulating period, by using the photosensor array;
sensitivity adjustment image reading means for reading a sensitivity adjustment subject image using a plurality of image reading sensitivities;
optimal image reading sensitivity deriving means for deriving an image reading sensitivity optimal for reading the subject image, based on a pixel data group relating to an image pattern of the subject image read by the sensitivity adjustment image reading means;
wherein the optimal image reading sensitivity deriving means comprises specific data removal means for removing from the pixel data group specific pixel data including at least pixel data having a maximum or minimum value in the pixel data group so as to correct the pixel data group, wherein the optimal image reading sensitivity is derived based on the corrected pixel data group;

image reading sensitivity setting means for setting the optimal image reading sensitivity as the image reading sensitivity in the image reading section; and reading control means for controlling execution of reading of the subject image, by using the image reading sensitivity set by the image reading sensitivity setting means;

wherein the optimal image reading sensitivity deriving means further comprises:

image reading sensitivity extraction means for extracting an image reading sensitivity suitable for a normal reading operation of the subject image based on the pixel data group from which the specific pixel data has been removed by the specific data removal means; and setting means for setting as the optimal image reading sensitivity the image reading sensitivity extracted by the image reading sensitivity extraction means; and wherein the image reading sensitivity extraction means comprises:

data extraction means for extracting maximum and minimum values from the pixel data group from which the specific data has been removed for each said image reading sensitivity;

data range calculation means for calculating a data range of the pixel data group for each said image reading sensitivity based on the maximum and minimum values of the pixel data group extracted by the data extraction means; and extraction means for extracting an image reading sensitivity having a maximum data range out of data ranges of pixel data groups for the respective image reading sensitivities.

39. A drive control method for a photosensor system which includes a photosensor array comprising a plurality of two-dimensionally arrayed photosensors, and which reads a subject image by using the photosensor array, said method comprising:

reading a sensitivity adjustment subject image using a plurality of image reading sensitivities corresponding to respective charge accumulating periods;

deriving an image reading sensitivity suitable for reading the subject image based on a pixel data group relating to an image pattern of the subject image read from the sensitivity adjustment subject image;

wherein deriving the image reading sensitivity comprises removing from the pixel data group specific pixel data including at least pixel data having a maximum or minimum value in the pixel data group so as to correct the pixel data group; and setting the derived image reading sensitivity as a reading sensitivity for reading the subject image thereby executing reading of the subject image, by using the image reading sensitivity;

wherein deriving the image reading sensitivity suitable for reading the subject image further comprises extracting an image reading sensitivity suitable for a normal reading operation of the subject image based on the pixel data group from which the specific pixel data has been removed; and wherein extracting the image reading sensitivity suitable for the normal reading operation of the subject image comprises:

extracting maximum and minimum values from the pixel data group from which the specific data has been removed for each said image reading sensitivity;

calculating a data range of the pixel data group for each said image reading sensitivity based on the maximum and minimum values of the pixel data group extracted for each said image reading sensitivity; and extracting an image reading sensitivity having a maximum data range out of data ranges of pixel data groups for the respective image reading sensitivities.

* * * * *